(12) United States Patent
Meersma et al.

(10) Patent No.: US 11,336,703 B1
(45) Date of Patent: May 17, 2022

(54) AUTOMATED NOTIFICATION OF CONTENT UPDATE PROVIDING LIVE REPRESENTATION OF CONTENT INLINE THROUGH HOST SERVICE ENDPOINT(S)

(71) Applicant: Microsoft Technology Licensing, LLC, Redmond, WA (US)

(72) Inventors: Brian Daniel Meersma, Redmond, WA (US); Patrick Michael Gan, Salem, MA (US); Kori Michelle Loomis, Redmond, WA (US); Vivek Mogalapalli, Bellevue, WA (US); Cosmin Catrinescu, Kirkland, WA (US); Theo Lorrain-Hale, Boston, MA (US); Simoune Rebekah Morena Valerio Lucas, Seattle, WA (US); Andrew Boktor, Woodinville, WA (US); Sugandha SudeshKumar Kapoor, Kirkland, WA (US); Orkhan Muradov, Kirkland, WA (US); Nikhil Vilas Kulkarni, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/231,181

(22) Filed: Apr. 15, 2021

(51) Int. Cl.
*H04L 29/06* (2006.01)
*H04L 65/401* (2022.01)
(Continued)

(52) U.S. Cl.
CPC .......... *H04L 65/4015* (2013.01); *G08B 21/24* (2013.01); *H04L 51/046* (2013.01); *H04L 51/063* (2013.01); *H04L 67/146* (2013.01)

(58) Field of Classification Search
CPC .. H04L 65/4015; H04L 51/063; H04L 51/046
See application file for complete search history.

(56) References Cited

U.S. PATENT DOCUMENTS

| 9,300,609 | B1 * | 3/2016 | Beausoleil | .......... G06F 3/04817 |
| 9,769,104 | B2 * | 9/2017 | Appelman | ............. G06Q 10/10 |

(Continued)

FOREIGN PATENT DOCUMENTS

| WO | WO-2004084044 A2 * | 9/2004 | ............. H04L 51/22 |
| WO | WO-2018169711 A1 * | 9/2018 | ........... G06F 40/106 |

OTHER PUBLICATIONS

Warren, Tom, "Microsoft's New Fluid Office Document Is Google Docs on Steroids", Retrieved from: https://www.theverge.com/2020/5/19/21260005/microsoft-office-fluid-web-document-features-build, May 19, 2020, 9 Pages.
(Continued)

*Primary Examiner* — Jerry B Dennison

(57) ABSTRACT

The present disclosure is directed to automated notification generation, where a generated notification comprises a live representation of a content update that is linked and synchronized with a distributed collaborative canvas (or other source content) comprising the content portion which is being updated. A non-limiting example of a content update is a message notification, such as an at-mention (@mention), that is included inline within a content portion. Other triggers for automated notification generation are also described. Generation of an exemplary notification comprises a contextual relevance analysis that not only selects, for a recipient of the message notification, a specific host application/service endpoint to present the notification in but also determines how/what specific content to present inline within the selected host application/service endpoint. The notification is automatically generated and provided to a
(Continued)

selected host application/service endpoint for rendering of the notification inline with content of the host application/service endpoint.

20 Claims, 9 Drawing Sheets

(51) Int. Cl.
    *G08B 21/24*     (2006.01)
    *H04L 67/146*     (2022.01)
    *H04L 51/046*     (2022.01)
    *H04L 51/063*     (2022.01)

(56) References Cited

U.S. PATENT DOCUMENTS

| | | | |
|---|---|---|---|
| 10,171,552 B2* | 1/2019 | Hausler | H04L 67/02 |
| 10,606,576 B1* | 3/2020 | Tung | G06F 21/53 |
| 11,153,532 B1* | 10/2021 | Gupta | H04N 7/155 |
| 11,200,569 B1* | 12/2021 | James | G06Q 20/3829 |
| 2004/0153504 A1 | 8/2004 | Hutchinson et al. | |
| 2011/0161425 A1 | 6/2011 | Xiao et al. | |
| 2012/0130954 A1 | 5/2012 | Hood | |
| 2012/0250780 A1 | 10/2012 | Shen et al. | |
| 2012/0284635 A1 | 11/2012 | Sitrick et al. | |
| 2015/0193492 A1* | 7/2015 | Gunaratne | G06F 40/166 |
| | | | 707/609 |
| 2015/0370769 A1 | 12/2015 | Saviano et al. | |
| 2016/0315995 A1* | 10/2016 | Hausler | G06F 40/279 |
| 2017/0083211 A1 | 3/2017 | Ramkumar et al. | |
| 2017/0353466 A1 | 12/2017 | Weaver et al. | |
| 2018/0121038 A1 | 5/2018 | Bliss et al. | |
| 2018/0121394 A1* | 5/2018 | Denoue | H04L 51/16 |
| 2018/0247243 A1 | 8/2018 | Moolman et al. | |
| 2018/0260366 A1 | 9/2018 | Brasket et al. | |
| 2018/0337877 A1 | 11/2018 | Lane et al. | |
| 2019/0147402 A1* | 5/2019 | Sitrick | H04M 3/567 |
| | | | 705/301 |
| 2021/0109892 A1* | 4/2021 | Groff | G06F 16/248 |

OTHER PUBLICATIONS

"Notice of Allowance Issued in U.S. Appl. No. 17/231,270", dated Sep. 22, 2021, 11 Pages.

Anderson, Tim, "Imagine OLE Reinvented for the Web and that's 90% of Microsoft's Fluid Framework: We Dig into O365 Collaborative Tech", Retrieved from: https://www.theregister.com/2019/11/05/microsoft_previews_fluid_framework/, Nov. 5, 2019, 12 Pages.

Fisher, Stephanie, "Your Guide to Collaborative Document Editing With Google Docs", Retrieved from: https://www.mojomedialabs.com/blog/your-guide-to-collaborative-document-editing-with-google-docs, Jul. 18, 2018, 24 Pages.

"Non Final Office Action Issued In U.S. Appl. No. 17/231,236", dated Dec. 7, 2021, 14 Pages.

* cited by examiner

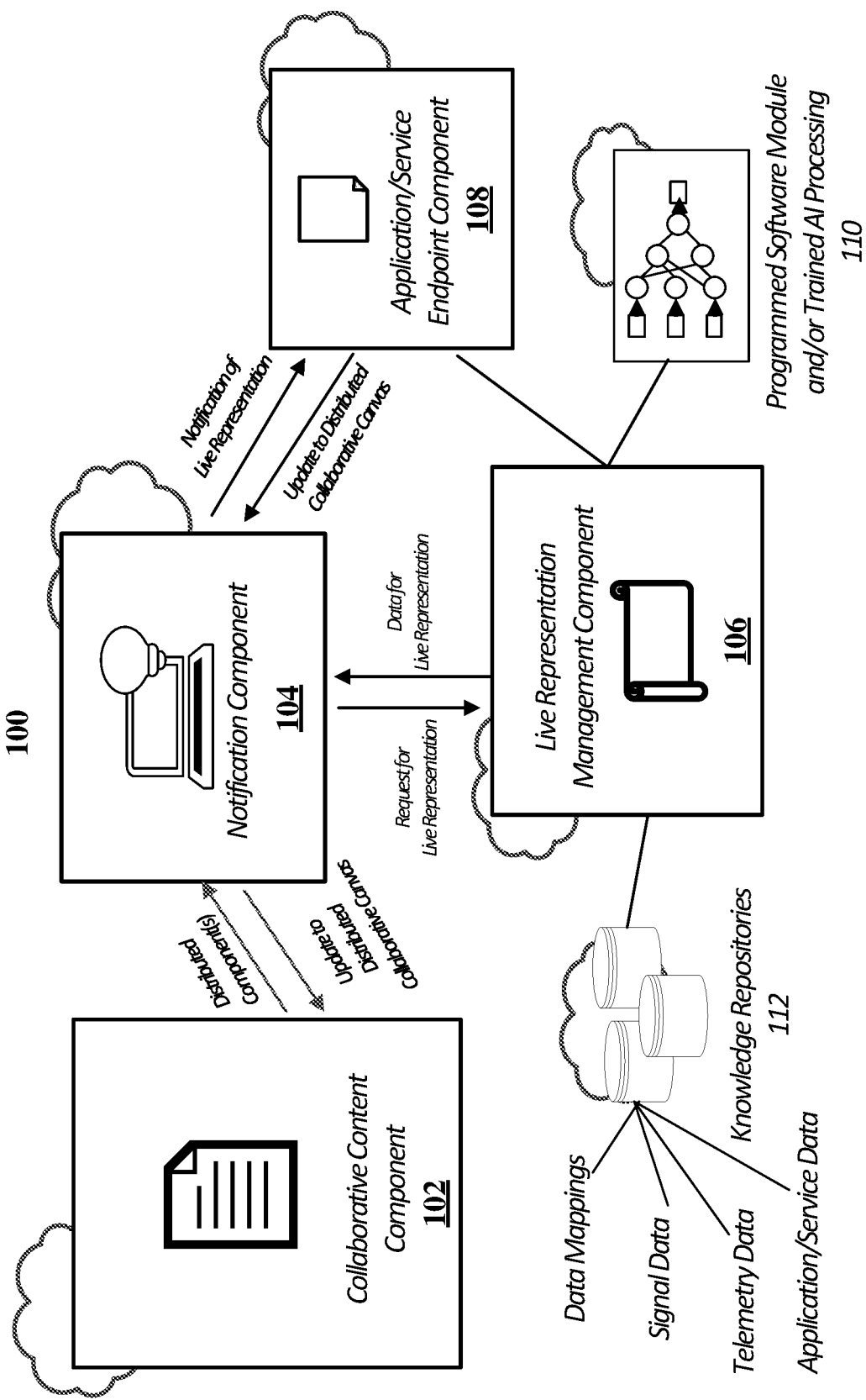

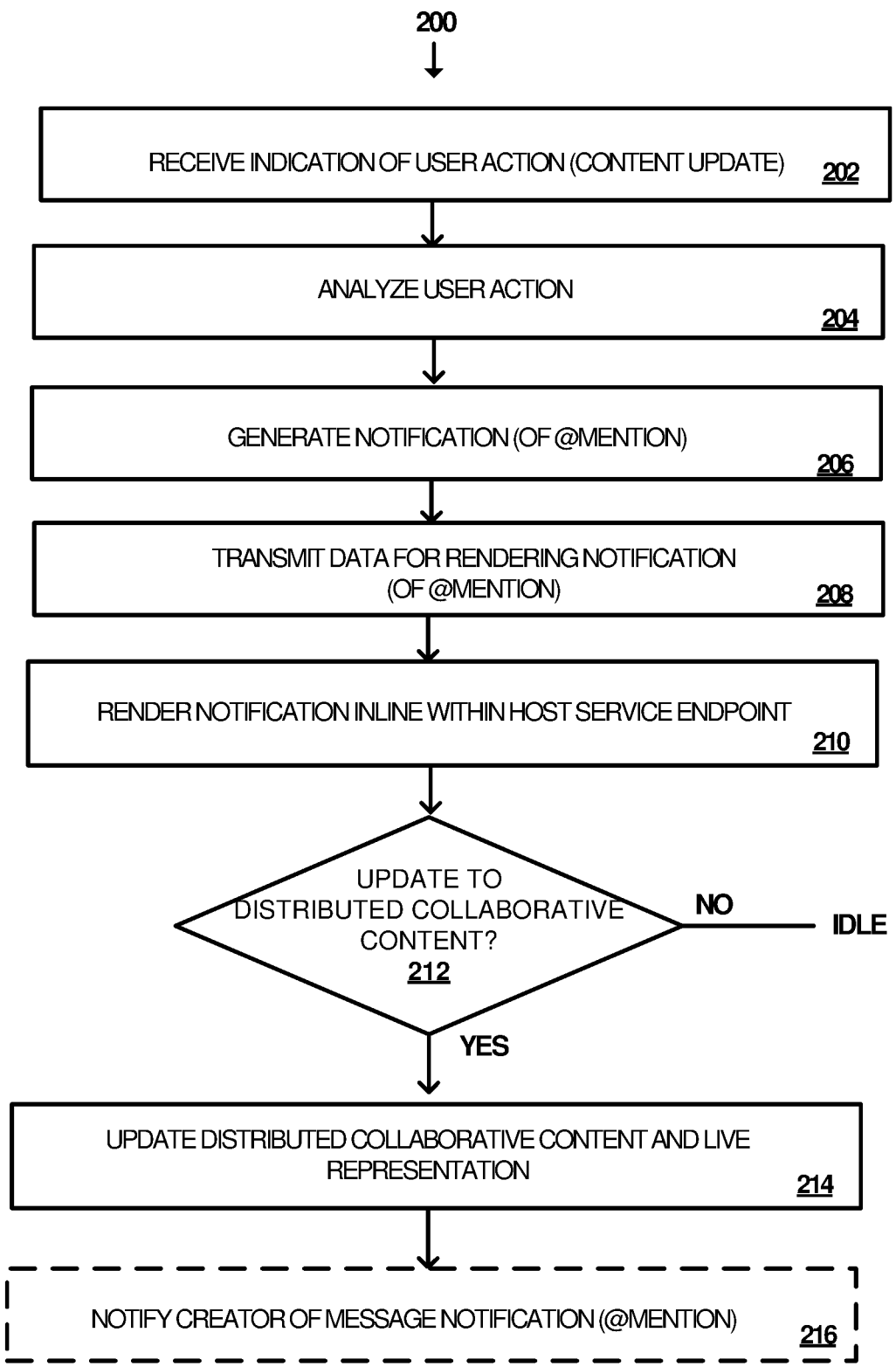

FIGURE 3A
300
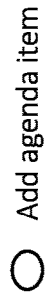
Agenda
○ Add agenda item
Notes
⊕ Add notes
Tasks 304
Tasks | Assigned To | Due Date
○ Add Data Link | @Doug | 308
➕ Add Task
302
306

310

320

FIGURE 3F
360

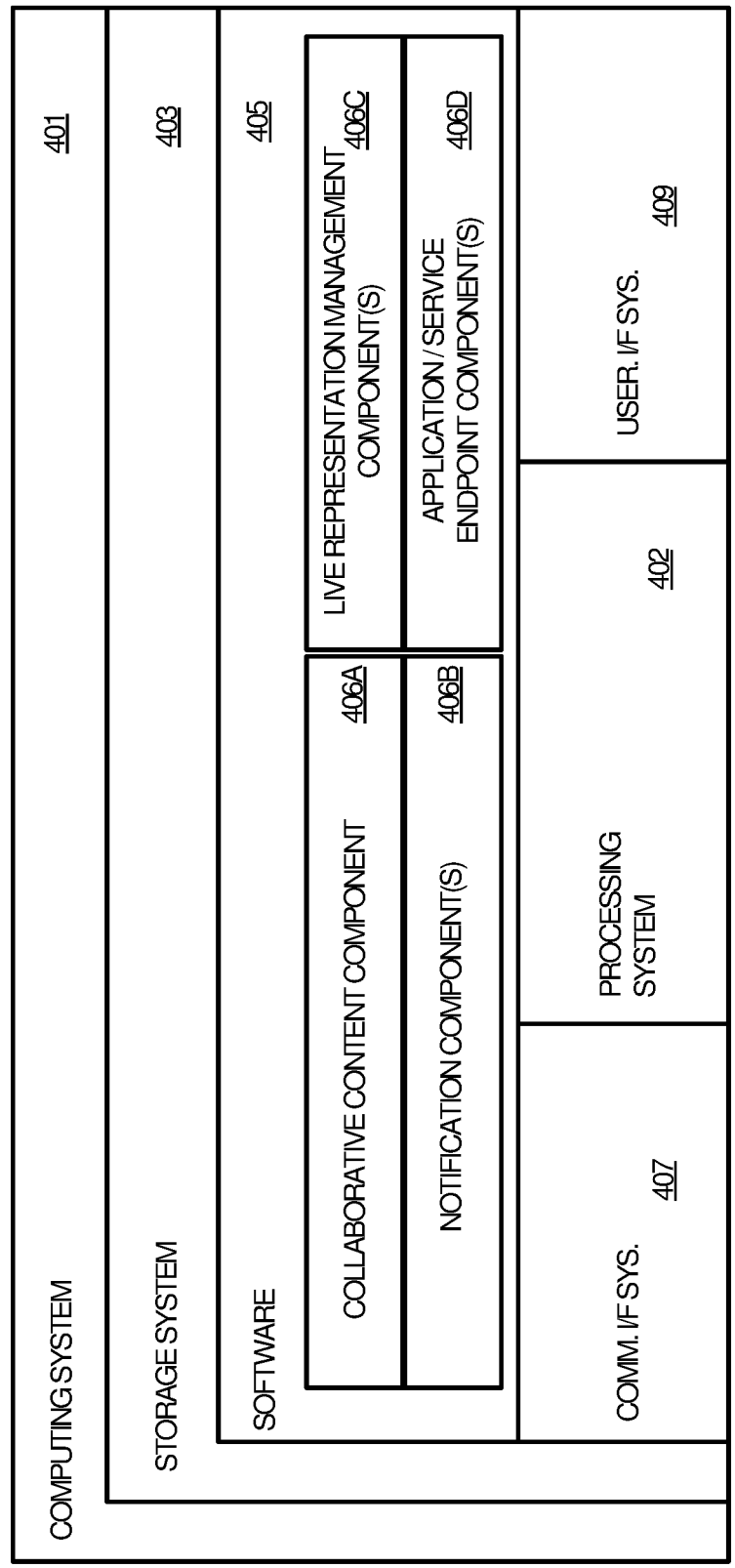

AUTOMATED NOTIFICATION OF CONTENT UPDATE PROVIDING LIVE REPRESENTATION OF CONTENT INLINE THROUGH HOST SERVICE ENDPOINT(S)

BACKGROUND

Traditionally, users receive notifications from other users requesting the performance of a task. For instance, a user may request that another user update a section of a word processing document. If the receiving user wishes to update the section of the word processing document, that user would need to execute numerous processing operations via their computing device including but not limited to: locating the word processing document; opening the word processing document; navigating to the section to be updated; applying the desired changes; and saving the word processing document. While users have accepted this practice requiring execution of numerous processing steps to complete an update of content following a notification, processing efficiency stands to be improved by streamlining the process of linking a notification with specific content and further connecting a user directly with the content via the notification.

Yet another technical challenge exists pertaining to remote collaborative access to content shared between users. A user may store a local version of a document on their computing device while editing that content. Concurrently, other users may also be editing that content with their own stored versions. When it comes time to merge those different versions, content changes can become a point of confusion for not only a user but a system trying to manage multiple versions of a document. This technical challenge further extends to technical scenarios where a group of users are collaboratively editing a document and a task requiring a response is presented for a user inline with other content. The user may be unaware of which user assigned the task, asked the question etc., and may also not receive an automatic notification that a user was mentioned in association with content, ultimately raising the likelihood that the user does not immediately respond to a notification. As such, notification processing stands to be improved from a processing efficiency standpoint (e.g., for computing devices) but also to improve usability of applications/services and user productivity through said applications/services.

Additional technical challenges exist in instances where content is included in a notification for user review. Traditionally, content presented in a notification is rendered as a static representation, where the content may be a snapshot of an electronic document at a time the notification was sent rather than a live link back to the original electronic document. This static representation (static snapshot) can quickly become outdated. Changes made to a static representation of content are not instantaneously synchronized with an original electronic document, thereby greatly increasing the likelihood that an electronic document becomes unsynchronized with a snapshot representation presented in a notification. There are also drawbacks from a processing efficiency standpoint as a user would then have to request additional processing operations to be executed (as previously mentioned) to secondarily access an electronic document and replicate a change.

SUMMARY

For resolution of the above identified technical problems and other reasons, the present disclosure is directed to automated notification generation pertaining to content updates. A generated notification comprises a live representation of a content update that is linked and synchronized with a distributed collaborative canvas (or other source content), where the live representation is embedded inline with content of a host application/service endpoint. A non-limiting example of a content update is a message notification, such as an at-mention (@mention), that is included inline within a content portion. Identification of a message notification (e.g., @mention) is a trigger for executing processing to generate a notification of the present disclosure. Other triggers for automated notification generation are also described.

Generation of an exemplary notification comprises a contextual relevance analysis that not only selects a specific host application/service endpoint to present the notification but also determines how/what specific content to present inline within the selected host application/service endpoint. A live representation provides a deep link to the distributed collaborative canvas (or original source content) displaying only content, including the message notification (or other type of content update), associated with a content sub-range of the distributed collaborative canvas. Data for rendering the notification may be transmitted to a selected host application/service endpoint (or endpoints). The data for rendering the notification comprises data that enables presentation of the notification, including automatic rendering of the live representation, inline with content of the host application/service endpoint.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary system diagram of components interfacing to enable automatic generation and management of notifications of content updates that are selectively provided inline across different host services relative to a distributed collaborative canvas, with which aspects of the present disclosure may be practiced.

FIG. 2 illustrates exemplary method related to automatic generation and management of notifications of content updates that are selectively provided inline across different host services relative to a distributed collaborative canvas, with which aspects of the present disclosure may be practiced.

FIGS. 3A-3F illustrate exemplary processing device views associated with user interface examples for an improved user interface that is adapted for generation and management of notifications of content updates across different host services relative to a distributed collaborative canvas, with which aspects of the present disclosure may be practiced.

FIG. 4 illustrates a computing system suitable for implementing processing operations described herein related to generation and management of notifications of content updates across different host services relative to a distributed collaborative canvas, with which aspects of the present disclosure may be practiced.

DETAILED DESCRIPTION

Figure 3B:
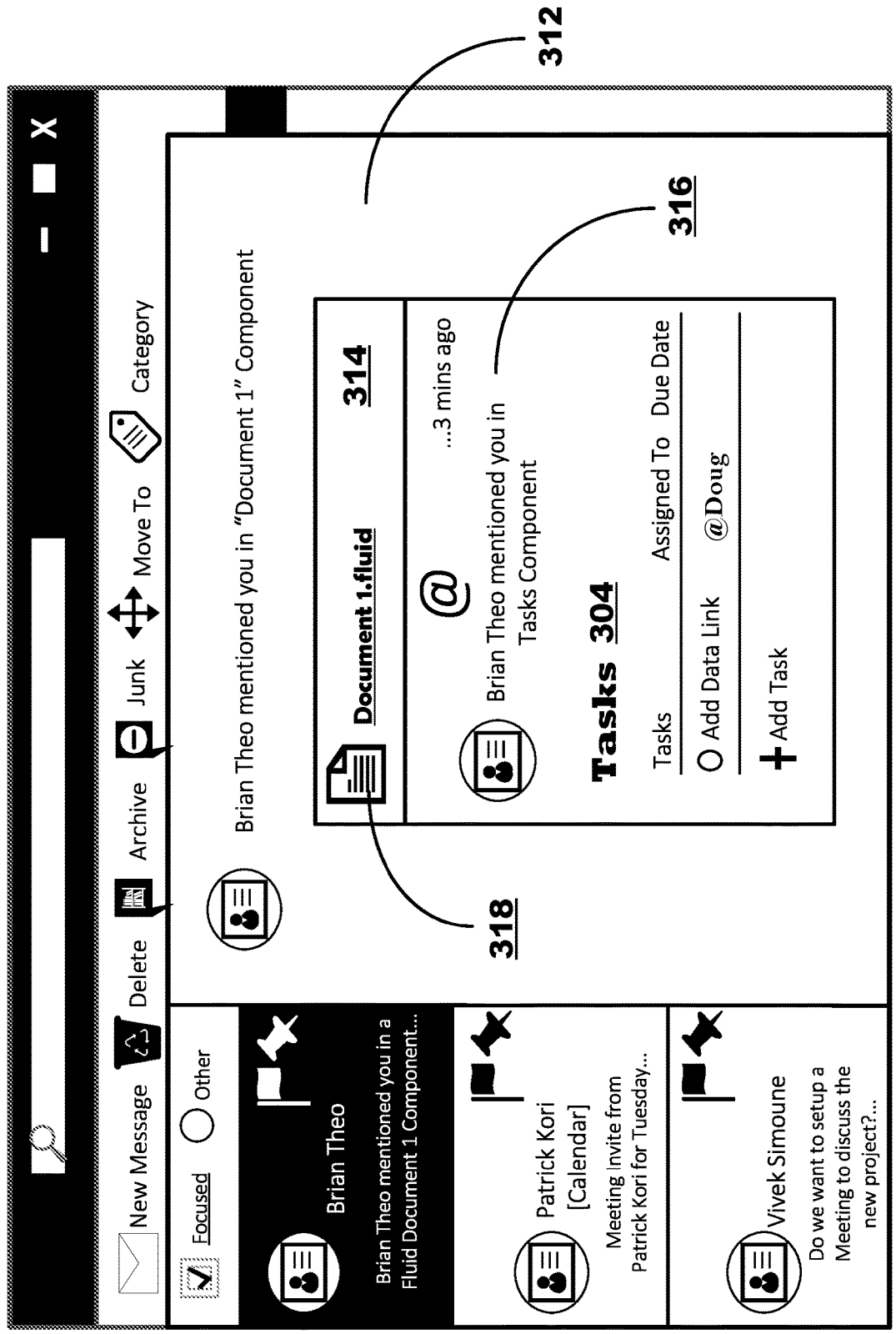

As identified in the foregoing, there is a technical need for automated notification generation, where a generated notification comprises a live representation of a content update that is linked and synchronized with a distributed collaborative canvas (or other source content) that contains a content update. A non-limiting example of a content update is a message notification, such as an at-mention (@mention), that is included inline within a content portion. Other triggers for automated notification generation are also described. Inline, as referenced in the present disclosure, is intended to refer to technical instances where data is embedded as a content portion (data object), among other content portions, that is displayable within a rendering of a host application/service. For instance, a GUI notification and associated data (e.g., live representation), are embedded components that is appears as content portions within a GUI of a host application/service endpoint. Non-limiting examples of content presented inline are illustrated in FIGS. 3A-3F.

With respect to triggers for automatic notification generation, a message notification (e.g., an at-mention/@mention) is provided herein for ease of explanation. It is to be recognized that automatic notifications, including live representations, can be generated for other types of content updates. Generation of an exemplary notification comprises a contextual relevance analysis that not only selects a specific host application/service endpoint to present the notification but also determines how/what specific content to present inline within the selected host application/service endpoint. A live representation provides a deep link to the distributed collaborative canvas displaying only content, including the message notification, associated with a content sub-range of the distributed collaborative canvas. Data for rendering the notification may be transmitted to a selected host service endpoint (or endpoints). The data for rendering the notification comprises data that enables presentation of the notification, including automatic rendering of the live representation, that comprises a content portion, determined to be most relevant to user (rather than an entire document), inline with content of the host service endpoint.

In one non-limiting example, an indication of a user action is received, where the user action is a content update that adds a message notification (e.g., @mention) to any of: 1) a distributed collaborative canvas (e.g., one or more content portions thereof); 2) a live representation of one or more content portions of a distributed collaborative canvas presented through a host application/service endpoint; and 3) inline with content of a host application/service endpoint. A distributed collaborative canvas is not limited to being a specific document. However, electronic documents can be rendered from a representation of a distributed collaborative canvas. As one example, a distributed collaborative canvas may be an electronic document that is stored on a distributed data storage and collaboratively accessible by two or more users. An example of a distributed collaborative document is a MICROSOFT® FLUID® document that comprises a plurality of components in aggregation, where individual components of the document are also treatable as individual data objects (e.g., individual content portions). In response to receiving the indication of the user action, the user action is analyzed. Analysis of the user action comprises: determining a user account to set as a recipient of a message notification (e.g., at-mention/@mention); and programmatically determining a navigation parameter indicating a content sub-range of the content portion of distributed collaborative canvas relative to an occurrence of the at-mention (@mention). Furthermore, the analyzing of the user action may further comprise: automatically creating a notification association between the user account, identified as the recipient of the at-mention, and a second user account corresponding with a creator of the at-mention. The notification association is configured to automatically create a rule that transmits a notification to the second user account, associated with the creator of the at-mention, when the first user account updates content provided in the live representation. This helps keep the creator of the content in the loop as to when/how content of a distributed collaborative canvas is updated.

Moreover, a notification for notifying the user account (recipient) of the message notification (e.g., @mention) is automatically generated. Generation of an exemplary notification comprises a contextual relevance analysis that determines not only select a specific host service endpoint to present the notification in but also determine how/what specific content to present inline within the selected host service endpoint. For example, generation of a notification of the present disclosure comprises: selecting a host service endpoint to present the notification based on analysis of user context data associated with the user account; and generating a live representation of the distributed collaborative canvas (or content portions). The selecting of the host service endpoint further comprises: applying a trained artificial intelligence (AI) model that is adapted to analyze the user context data associated with the user account to select, from a plurality of host service endpoints associated with the user account, the host service endpoint. The applying of the trained AI model comprises: executing a relevance analysis that generates a relevance ranking of each of the plurality of host service endpoints associated with the user account based on a collective analysis of two or more of: a first metric generated based on an evaluation of a level of integration of a specific host service endpoint with an open-source collaborative framework; a second metric generated based on an evaluation of past user activity with the specific host service endpoint; a third metric generated based on an evaluation of current user activity with the specific host service endpoint; a fourth metric pertaining to a determination as to whether the location of a specific content update (e.g., message notification) is already represented within a host application/service endpoint for a specific user; or a combination thereof. The host service endpoint is selected to present the notification based on a result of analyzing the relevance ranking associated with each of the plurality of host service endpoints. In some examples, a fourth metric is further implemented to aid select of a host application/service endpoint. For instance, a fourth metric pertains to a determination as to whether the location of a specific content update (e.g., message notification) is already represented within a host application/service endpoint for a specific user. When there are multiple instances of live representations presented across different host application/service endpoints, a relevance analysis is executed to determine a most relevant host application/service endpoint to render an update. A relevance analysis may score a relevance of the type of content update to the content (of live representations) that are already presented to users.

An exemplary live representation provides a deep link to the distributed collaborative canvas displaying only content, including the at-mention (@mention), associated with the content sub-range based on analysis of the navigation parameter. Data for rendering the notification may be transmitted to a selected host application/service endpoint (or endpoints). The data for rendering the notification comprises data that enables presentation of the notification including automatic rendering of the live representation inline with content of the host service endpoint. In further examples, the notification is automatically rendered within the host application/service endpoint based on a result of a receipt of a transmission of the data for rendering the notification. As previously mentioned, the notification, comprising the live representation, is rendered inline with content of the host application/service endpoint. An exemplary notification further comprises a link to the distributed collaborative canvas, contextual information pertaining to a message notification (e.g., the context surrounding the at-mention including the user account that created the at-mention, associated timestamp data, etc.). Additionally, other graphical user interface (GUI) elements may be incorporated in an exemplary notification to aid user understanding and productivity. For instance, data insights may be presented in association with a notification to provide context for creation/update to content portions of the distributed collaborative canvas relative to the live representation. In further instances, data insight notifications may be automatically created and transmitted to other user accounts associated with a distributed collaborative canvas (e.g., the creator of the message notification).

For ease of understanding, one specific non-limiting example is now described pertaining to the contextual selection of a host service endpoint. The selecting of the host service endpoint to present the notification automatically determines, as the host service endpoint, an email service associated with the user account. This may occur based on contextual analysis of signal data indicating user preferences and/or activity for pertaining to the receipt of message notifications and/or application/service preferences set for specific types of message notifications relative to an open-source collaborative framework (e.g., MICROSOFT® FLUID®). Following that example, generating of the live representation comprises: automatically generating data for rendering the live representation within a body of an email, which can then be rendered by the email service. In another example, a host service endpoint determines that the most contextually relevant host service endpoint is a collaborative communication application/service (e.g., MICROSOFT® TEAMS®). For instance, a notification, including the live representation, may be automatically presented inline within a chat conversation of the collaborative communication application/service. In further examples, contextual analysis may select a specific device-endpoint for a selected host service. For example, a notification may be presented via a mobile version of a host service or a full access version (e.g., desktop version) of the host service.

In further technical instances, an update to a content portion, that is presented in the live representation or a change to the original content portion presented in the distributed collaborative canvas, results in synchronization between the distributed collaborative canvas and the live representation. For instance, an indication of an update to the live representation by the user account is received (e.g., via the embedded content presented within a GUI of a host application/service endpoint). In response to receiving the indication of the update to the live representation, the update is automatically applied to the distributed collaborative canvas via the deep link.

For example, an indication of an update to the live representation by the user account is received from either a notification component or a host application/service endpoint component. In response to receiving the indication of the update to the live representation, the update is automatically applied to the distributed collaborative canvas via the deep link created between the live representation and the distributed collaborative canvas.

Exemplary technical advantages provided by processing described in the present disclosure comprise but are not limited to: improved server-side processing for management of message notifications relative to a content update (e.g., of a distributed collaborative canvas); processing operations that intelligently apply contextual analysis to determine how to generate an automated notification of a content update; an improved user interface (GUI) adapted to provide notifications that are integrated within a variety of applications/services; application of specific purpose computing to improve notification generation including, in some technical examples, application of trained AI processing to enhance processing described herein; improved processing efficiency (e.g., reduction in processing cycles, saving resources/bandwidth) for computing devices when generating and rendering notifications including live representations of content; reduction in latency through efficient processing operations that improve correlation of content among different applications/services including integration of exemplary notifications inline within different host service endpoints; implementation of a novel live representation management component that is further configured to interface with a plurality of other components to enable provision of automated notifications through different host service endpoints (e.g., endpoints of host applications/services of a distributed software platform); and improving usability of host applications/services for users via integration of processing described herein, among other technical advantages.

FIG. 1 illustrates an exemplary system diagram 100 of components interfacing to enable automatic generation and management of notifications of content updates that are selectively provided inline across different host services relative to a distributed collaborative canvas, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in method 200 (FIG. 2) as well as processing described in and associated with processing device views of FIGS. 3A-3F and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises a collaborative content component 102; a notification component 104; a live representation management component 106; an application/service endpoint component 108; a component for implementation of a programmed software module and/or trained AI processing 110; and knowledge repositories 112.

A collaborative content component 102 is one or more computer components (hardware, software or a combination thereof) configured to enable management of access to a distributed collaborative canvas. A distributed collaborative canvas is a workspace that is stored and accessible via a distributed data storage allowing multiple users to work together within the workspace on the same document) at the same time. A distributed collaborative canvas is rendered in a format that is supported by a collaborative framework providing technical support for managing components as individual data objects as well as aggregation within a distributed collaborative canvas (e.g., distributed collaborative document/distributed electronic document). An exemplary collaborative framework may be an open-source collaborative framework configured to enable integration of exemplary components in a format that is understandable by a variety of applications/services and/or distributed software platforms to enable cross-service usage and extensibility. A non-limiting example of an open-source collaborative framework is the MICROSOFT® FLUID® framework. Implementation of such a framework to enable execution of processing operations described herein is known to one skilled in the field of art. Above what is traditionally known is the processing described herein pertaining to the automatic generation of notifications and management of the same across different host application/service endpoints. As previously mentioned, an example of a distributed collaborative canvas is an electronic document, rendered from a representation of the distributed collaborative canvas, that is stored on a distributed storage and collaboratively accessible by two or more users. However, it is to be recognized that a distributed collaborative canvas is not required to be formatted as a single electronic document. An example of a distributed collaborative document is a MICROSOFT® FLUID® document that comprises a plurality of components in aggregation, where individual components of the document are also treatable as individual data objects (e.g., individual content portions). Components of a distributed collaborative document are rendered entirely inline in an experience in which a component is embedded in. For instance, a main (original) source of a distributed collaborative document is managed by a file hosting service (e.g., ONEDRIVE®) and/or a collaborative file management platform (e.g., SHAREPOINT®), that further synchronizes stored content with host applications/services of a distributed software platform. Inline, as referenced in the present disclosure, is intended to refer to technical instances where data is embedded as a content portion (data object), among other content portions, that is displayable within a rendering of a host application/service. For instance, a GUI notification and associated data (e.g., live representation), are embedded components that is appears as content portions within a GUI of a host application/service endpoint. Non-limiting examples of content presented inline are illustrated in FIGS. 3A-3F.

In addition to managing data storages related to content of a distributed collaborative canvas, the collaborative content component 102 is adapted to manage mappings of components (e.g., content portions) to distributed collaborative canvas (and/or related document representations). As previously referenced, components of a distributed collaborative canvas may be treated as individual data objects that may standalone and/or incorporated in one or more distributed collaborative electronic documents that are accessible (via a network connection) from a file hosting or file management application/service. For lookup purposes, mappings are created correlate individual components (content portions) with one or more distributed collaborative canvases and/or documents. For instance, data associated with a component comprises but is not limited to: an identification of the component (component ID); markers indicating positioning/location of a component (e.g., start/end range of content); identification of content types and/or positioning/formatting of content (e.g., lines, rows, columns, sizing); timestamp data related to creation and management of components; and user account access relative to content, among other examples. Other data that may be stored as part of an exemplary data mapping may comprise but is not limited to: data/metadata indicating user accounts associated with a distributed collaborative canvas (including multiple components); data/metadata indicating content updates to one or more components (e.g., content portions) of a distributed collaborative canvas including timestamp data and indications of user accounts that performed respective updates; data indicating message notifications pertaining to components of a distributed collaborative canvas; data/metadata indicating mapping between components and message notifications; data/metadata indicating content updates to components received via a live representation presented inline within a host service endpoint; and data/metadata indicating comments, tasks, reminders, etc., associated with a component (or live representation), among other examples. Any of the previously mentioned examples may be included in an individual or collective dating mapping, where a data mapping can be used to aid contextual analysis of a message notification including generation of data insights that may be presented in association with an exemplary notification. The collaborative content component 102 may interface with other components of system diagram 100 to enable querying of data mappings which can aid processing determinations for notification generation. For instance, notification component 104 and/or a live representation management component 106 may query the collaborative content component 102 to obtain data necessary for automatic generation of a notification (comprising a live representation). Furthermore, a programmed software module and/or trained AI processing may be adapted to obtain and utilize any of the above identified data pertaining to a data mapping (individually or in combination) to aid relevance processing for determining how to generate an exemplary notification and/or associated data insights. An AI model (e.g., machine learning model) may be trained to correlate data associated with a data mapping with user context data (e.g., including user activity current or past user activity and/or user preferences) to automatically generate determinations that aid contextually relevant notification generation. Additionally, exemplary knowledge repositories 112, as subsequently described, may store data needed to execute any processing operations described herein, including data mappings generated by the collaborative content component 102.

An exemplary notification component 104 is one or more computer components (hardware, software or a combination thereof) configured to manage automatic generation of a notification of the present disclosure. A generated notification comprises a live representation of a content update that is linked and synchronized with a distributed collaborative canvas comprising the content portion which is being updated. A non-limiting example of a content update is a message notification, such as an at-mention (@mention), that is included inline within a content portion. Identification of a message notification (e.g., @mention) is a trigger for executing processing to generate a notification of the present disclosure. In other examples, signal data is analyzed relative to specific component or content portions or a specific action (or task) executed by a user relative to content (e.g., distributed collaborative canvas) rendered inline within a host application/service. For example, in a meeting trained AI processing is applied to detect tasks being mentioned by participants of the meeting or occurrences of events (e.g., error detected in a system), where a trained AI model is configured to automatically add those tasks or events to the distributed collaborative canvas. If the tasks relate to a specific user (or is related to a topic that the user typically works on), this can also be a trigger for automatically sending a notification. In yet another example, trained AI processing is applied to determine data/content portions (e.g., components) of relevance to a user (e.g., based on a result of evaluating relevance scoring that evaluates an importance of a content portion to a specific user). Relevance analysis may be based on evaluation of signal data described herein including signal data pertaining to user activity related to specific data (e.g., a content portion). If there is an update to that data/content portion, a notification is automatically generated and sent to a user.

To provide a contextually relevant notification, the notification component 104 interface with the collaborative content component 102, the live representation management component 106 and the component for implementation of a programmed software module and/or trained AI processing. In doing so, a contextual relevance analysis is executed that determines not only select a specific host application/service endpoint to present the notification in but also determine how/what specific content to present inline within the selected host application/service endpoint. For example, generation of a notification of the present disclosure comprises: selecting a host service endpoint to present the notification based on analysis of user context data associated with the user account; and generating a live representation of the distributed collaborative canvas (or associated content portions). The selecting of the host service endpoint further comprises: applying a trained AI model that is adapted to analyze the user context data associated with the user account to select, from a plurality of host service endpoints associated with the user account, the host service endpoint. An application of the trained AI model comprises: executing a relevance analysis that generates a relevance ranking of each of the plurality of host service endpoints associated with the user account based on a collective analysis of two or more of: a first metric generated based on an evaluation of a level of integration of a specific host service endpoint with an open-source collaborative framework; a second metric generated based on an evaluation of past user activity with the specific host service endpoint; a third metric generated based on an evaluation of current user activity with the specific host service endpoint a fourth metric pertaining to a determination as to whether the location of a specific content update (e.g., message notification) is already represented within a host application/service endpoint for a specific user; or a combination thereof. The host service endpoint is selected to present the notification based on a result of analyzing the relevance ranking associated with each of the plurality of host service endpoints. In some examples, a fourth metric is further implemented to aid select of a host application/service endpoint. For instance, a fourth metric pertains to a determination as to whether the location of a specific content update (e.g., message notification) is already represented within a host application/service endpoint for a specific user. When there are multiple instances of live representations presented across different host application/service endpoints, a relevance analysis is executed to determine a most relevant host application/service endpoint to render an update. A relevance analysis may score a relevance of the type of content update to the content (of live representations) that are already presented to users.

The notification component 104 acts as a bridge component for correlating the collaborative content of a distributed collaborative canvas with operation of a user (user account) with various host applications/services. For instance, data associated with a distributed collaborative canvas, including data mappings and/or data retrieved from analysis of data mappings, may be propagated to a notification component 104 and the live representation management component 106. Additionally, the notification component 104 may receive data from the application/service endpoint component 108 pertaining to user activity (past and present) with respect to specific host applications/services and associated endpoints. This enables correlation of a state of collaborative content (e.g., one or more components of a distributed collaborative canvas) with a user context relative to operation of a host application/service. The terminology referring to a host application/service and a host application/service endpoint is introduced to emphasize an additional layer of analysis of the present disclosure that pertains to not only determining a best possible host application/service to render a notification in, but also a specific endpoint of that host application/service that would be most contextually relevant for a user to receive the notification (e.g., based on user usage, preferences and/or application/service preferences set relative to an open-source collaborative framework). For instance, a user may be using a mobile computing device that is running a mobile version of a host application/service, where it makes sense to generate a notification for the parameters of mobile version rather than a desktop version. In other examples, an open-source collaborative framework may be integrated with some host applications/services (and related endpoints) but not others. This information may be useful to determine how to render a notification, what content to include therein as well as what host application/service endpoints may be optimal to receive notifications. As an example, if an open-source collaborative framework is well-integrated with an email application/service as opposed to a messaging application/service, this data may be useful for a system in a contextual analysis to determine that it may be best to generate a notification for an email application/service rather than the messaging application/service. Of course, it is to be recognized that this type of analysis can be combined with analysis of user context data to select an optimal host application/service endpoint. For example, if an open-source collaborative framework is integrated with a plurality of host applications/services, analysis of user context data is still useful to help curate options for notification including determining a relevance as to which application/service a user may prefer to receive a notification as well as the form of presentation of a notification (e.g., via a GUI icon, callout, email/message, OS notification).

Moreover, the notification component 104 is configured to manage its own set of data mappings that correlate collaborative content of a distributed collaborative canvas with operation of a user (user account) with various host applications/services (e.g., received from the host application/service endpoint component 108). For instance, the notification component 104 manages data mappings pertaining to a working set (or work set) that identify relationships between one or more components of a distributed collaborative canvas and an electronic file/document associated with a host application/service endpoint. Relationships, in the context of a working set, pertain to identification of technical instances where: a component of a distributed collaborative canvas are included within an electronic file/document; telemetry data pertaining to individual and/or collective instances where components are included in electronic files/documents; content ranges pertaining to inclusion of components (e.g., content portions) within an electronic document file; and evaluation of user accounts associated with components and/or electronic files/documents (e.g., cross-referencing user accounts between a distributed collaborative canvas and an electronic file/document provided through a host service endpoint).

As a non-limiting example, a data mapping for a working set may be generated relative to an individual user account or a relationship between user accounts. For instance, a user-specific working set may be generated for a user (or user interaction), where a correlation can be identified between components of a distributed collaborative canvas that are associated with a specific user account and recently interacted files, by the user account (or a group of users), across various host application/service endpoints. That is, a working set of a user may identify relationships between components of distributed collaborative canvas being included in electronic files (documents, chats/messages, emails, etc.) associated with a user (or group of users). Essentially, a file-to-message mapping is generated for a user, where a listing is generated identifying distributed collaborative documents shared across host application/service mentions.

As an example, a content portion of a distributed collaborative canvas may be mentioned in various chat messages of a collaborative communication application/service (e.g., MICROSOFT® TEAMS®). Say a FLUID® document "document 1" is mentioned across various chat messages and/or emails. An exemplary working set mapping can quantify this to provide contextual analysis of a state of interaction (e.g., what components of "document 1" are respectively mentioned in chat 1, chat 2, email 1, email 2). This type of data may be generated prior to an evaluation of a current user context and/or occur (or be updated) relative to an evaluation of a current user context. Furthermore, the notification component 104 may further interface with the host application/service endpoint component 108 and/or the knowledge repositories 112 to manage and store data needed to execute analysis described herein. For instance, knowledge repositories 112, as subsequently described, may store data needed to execute any processing operations described herein, including data mappings generated by the notification component 104.

The notification component 104 further manages data related to a user context derived from analysis of a collection of signal data associated with operation of a user account. Signal data may be collectively analyzed to generation determinations described herein including those where the live representation management component 106 and/or component implementing the programmed software module and/or trained AI processing 108 are executing importance/relevance scoring/ranking to automatically generate determinations described herein. For instance, application of trained AI model (or models) may be trained to evaluate past and/or current user actions, user preferences, application/service log data, etc., that are each associated with one or more user accounts. Results of such analysis may be used to select a host application/service (and associated endpoint) for provision of an exemplary notification and/or an inline context to present the notification. Non-limiting examples of signal data that may be collected and analyzed comprises but is not limited to: device-specific signal data collected from operation of one or more user computing devices; user-specific signal data collected from specific tenants/user-accounts with respect to access to any of: devices, login to a distributed software platform, applications/services, etc.; application-specific data collected from usage of applications/services and associated endpoints; or a combination thereof. Analysis of such types of signal data in an aggregate manner may be useful in helping generate contextually relevant determinations, data insights, etc. Analysis of exemplary signal data may comprise identifying correlations and relationships between the different types of signal data, where telemetric analysis may be applied to generate determinations with respect to a contextual state of user activity with respect to different host application/services and associated endpoints. For instance, a user may prefer to receive notifications through a specific host application/service endpoint as compared with other host application/service endpoints. In another technical instance, it may be determined that a user prefers to add context to a message notification that may be transmitted to a recipient and is also working in an email application/service. In that technical instance, a message notification may be automatically generated as a draft email that the user can add to (e.g., content and/or other users).

In some instances, the notification component 104 may not have a prior creating working set mapping. As an example, a message notification may be a first time that a user wishes to create an association between a component of a distributed collaborative content and content of a host application/service endpoint. In such instances, querying of a working set data mapping may yield a determination that prior record has not been created. This may initiate processing to create a working set data mapping specific to one or more components of a distributed collaborative canvas.

Furthermore, the notification component 104 may interface with the live representation management component 106 to request generation of a live representation for a message notification. A request for generation of a live representation may further comprise propagation of data mappings received from the collaborative content component 102 and/or created/managed by the notification component 104. The live representation management component 106 may generate determinations for creation of an exemplary notification including data to enable rendering of a live representation within an automatically created notification. As such, the notification component 104 may receive back data to enable automatic creation of a notification pertaining to a message notification (e.g., an @mention) by the notification component 104. The notification component 104 further interfaces with the application/service endpoint component 108 to transmit data for rendering of an exemplary notification including the live representation. The application/service endpoint component 108 further interfaces with the notification component 104 to provide updates to content associated with the operation of an application/service. This may comprise updates to a live representation, provided in a notification, that occur inline within content of a host application/service endpoint. The notification component 104 is further configured to foster a synchronization update to one or more components of a distributed collaborative canvas that may be received through a host application/ service endpoint and/or a direct update to a component of a distributed collaborative canvas.

The live representation management component 106 is one or more computer components (hardware, software or a combination thereof) configured to execute and manage processing operations related to generation and provision of determinations to aid generation of an exemplary notification. This comprises generation of a live representation that can be included in a notification (of a message notification) which is presented inline with content of a host application/service endpoint. In some examples, the live representation management component 106 may be a distributed computing device (e.g., distributed server device) that executes processing asynchronously from a user computing device that is usable to access a GUI of a host application/service endpoint. In other examples, the live representation management component 106 may be configured as a computing component (hardware, software or a combination thereof) that executes on the user computing device. A user computing device is an example of a computing system (401 of FIG. 4). In alternative examples, the live representation management component 106 is a system of components that execute across one or more server devices and one or more components executing on a computing system, where a network connection is usable to connect the components in a system configuration. The live representation management component 106 may be configured to execute any processing operations described herein, including those described relative to method 200 (FIG. 2), and processing associated with visual diagrams of FIGS. 3A-3F and further described in the accompanying description. It is further to be recognized that an order of execution of processing operations by the live representation management component 106 may vary without departing from the spirit of the present disclosure.

As previously referenced, live representation management component 106 interfaces with the notification component 104 to generate determinations usable to aid generation of an exemplary notification. This comprises generation of a live representation of one or more components of a distributed collaborative canvas, among other portions of a notification (pertaining to a message notification). As such, the live representation management component 106 may continuously interact with other components of system diagram 100, including the notification component 104, to provide a real-time (or near real-time) representation of content that is synchronized across any type of representation (including an original content source).

The application/service endpoint component 108 is one or more computer components (hardware, software or a combination thereof) configured to manage host applications/services and associated endpoints. As previously references, the application/service endpoint component 108 interfaces with other computer components of system diagram 100 to enable management of presentation of exemplary notifications in a contextually relevant manner (e.g., inline with content of a specific host application/service endpoint). An application/service endpoint component 108 further manages presentation of a GUI usable to present an exemplary notification and foster user interaction therewith. A host application/service configured to enable execution of tasks by one or more user accounts. Non-limiting examples of host applications/services that are applicable in the present disclosure comprise but are not limited to: open-source collaborative framework applications/services; video discussion applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/services; social networking applications/services; educational learning applications/services; and suites of applications/services that may collectively comprise a combination of one or more of the previously mentioned applications/services, among other examples. The application/service endpoint component 108 further manages respective endpoints associated with individual host applications/services, which have been referenced in the foregoing description. In some examples, an exemplary host application/service may be a component of a distributed software platform providing a suite of host applications/services and associated endpoints. A distributed software platform is configured to providing access to a plurality of applications/services, thereby enabling cross-application/service usage to enhance functionality of a specific application/service at run-time. For instance, a distributed software platform enables interfacing between a host service related to management of a distributed collaborative canvas and/or individual components associated therewith and other host application/service endpoints (e.g., configured for execution of specific tasks). Distributed software platforms may further manage tenant configurations/user accounts to manage access to features, applications/services, etc. as well access to distributed data storage (including user-specific distributed data storage). Moreover, specific host application/services (including those of a distributed software platform) may be configured to interface with other non-proprietary application/services (e.g., third-party applications/services) to extend functionality including data transformation and associated implementation.

The application/service endpoint component 108 is further configured to present, through interfacing with other computer components of system diagram 100, an adapted GUI that provides user notifications, GUI menus, GUI elements, etc., to manage rendering of message notifications and automatic notifications thereof. For instance, a GUI of a host application/service configured for management of a distributed collaborative canvas and/or individual components associated may enable content editing (e.g., of a distributed collaborative document) and presentation of synchronized updates to the same received through any live representations rendered inline within other host application/services (and associated endpoints). This may include automatic update of components through GUI features/elements that are presented without a user having to take manual action to request. In other instances, an application command control (e.g., user interface ribbon and/or GUI menus) may be adapted to include selectable user interface features related to management of notifications. For instance, GUI elements may be automatically generated and presented to bring attention to message notifications and associated content. Non-limiting visual examples of an improved GUI, and GUI elements provided therein, are provided in FIGS. 3A-3F.

Moreover, a component for implementation of a programmed software module and/or trained AI processing 110 may be applied to aid generation of processing determinations of other components of system diagram 100. An exemplary component for implementation trained AI processing 108 may manage AI modeling including the creation, training, application, and updating of AI modeling. In cases where trained AI processing is applied, general application of trained AI processing including creation, training and update thereof is known to one skilled the field of art. Above what is traditionally known, trained AI processing may be adapted to execute specific determinations described herein with reference to any component of system diagram 100 and processing operations executed thereby. For instance, AI model may be specifically trained and adapted for execution of processing operations comprising but not limited to: generation of any of the previously described data mappings; generation of determinations related to identified correlations between data mappings; creations of requests/responses; automatic generation of exemplary notifications pertaining to message notifications including automatic generation of determinations to aid notification generation; generation of a live representation of a component of a distributed collaborative canvas; determinations for inclusion of other content within a notification as described herein; determining of a timing as to when to surface a notification (e.g., based on analysis of users past behavior); relevance analysis to generate any determinations described herein; and generation of data for rendering GUI content and updates, among other examples. Exemplary AI processing may be applicable to aid any type of determinative or predictive processing by any components of system diagram 100, via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, a component for implementation of trained AI processing 108 may be configured to apply a ranker to generate relevance scoring to assist with any processing determinations with respect to any relevance analysis described herein.

Non-limiting examples of relevance scoring, and specific metrics used for relevance scoring have been referenced in the foregoing description and are subsequently described including the description of method 200 (FIG. 2). Scoring for relevance (or importance) ranking may be based on individual relevance scoring metrics described herein or an aggregation of said scoring metrics. In some alternative examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing. In some examples, business logic rules may be applied for the application of threshold and threshold evaluation used to make determinations based on relevance ranking.

The present disclosure also applies trained AI processing to make additional decisions about the behavior of the notification. For example, a trained AI model is adapted to decide when is an optimal time to surface the notification based on the recipients past behavior when interacting with notifications. Alternatively, a trained AI model is used to determine that a similar live notification has already been sent to the user and evaluate the user context (e.g., user interactions) with that notification) to determine whether a follow-up notification is to be sent. For instance, if a first notification is unread and the content within the original notification is live, a determination may be made that a second notification does not need to be sent. Similar to other trained AI processing examples, relevance analysis (relevance scoring) may be applied to aid decision making including analyzing non-limiting examples of signal data as described herein.

As referenced in the foregoing description, knowledge repositories 112 may be accessed to manage data aiding operation of any other computer components described in system diagram 100. Knowledge resources comprise any data affiliated with a software application platform (e.g., Microsoft®, Google®, Apple®, IBM®) as well as data that is obtained through interfacing with resources over a network connection including third-party applications/services. Knowledge repositories 112 may be resources accessible in a distributed manner via network connection that may store data usable to improve processing operations described herein. Examples of data maintained by knowledge repositories 112 comprises but is not limited to: data mappings (including working set data mappings); collected signal data (e.g., from usage of an application/service, device-specific, user-specific); telemetry data including past and present usage of a specific user and/or group of users; data for execution of application/services including host application/services and associated endpoints; corpuses of annotated data used to build and train AI processing classifiers for trained AI modeling; access to entity databases and/or other network graph databases usable for evaluation of signal data; web-based resources including any data accessible via network connection including data stored via distributed data storage; trained bots including those for natural language understanding; software modules and algorithms for contextual evaluation of content and metadata; and application/service data (e.g., data of applications/services managed by the application/service component 104) for execution of specific applications/services including electronic document metadata, among other examples. In even further examples, telemetry data may be collected, aggregated and correlated (e.g., by an interfacing application/service) to further provide computer components of system diagram 100 with on demand access to telemetry data which can aid determinations generated thereby.

FIG. 2 illustrates an exemplary method 200 related to automatic generation and management of notifications of content updates that are selectively provided inline across different host services relative to a distributed collaborative canvas, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100. Processing operations performed in method 200 may correspond to operations executed by a system and/or service that execute computer modules/programs, software agents, application programming interfaces (APIs), plugins, AI processing including application of trained data models, intelligent bots, neural networks, transformers and/or other types of machine-learning processing, among other examples. In one non-limiting example, processing operations described in method 200 may be executed by a computer component such as: a collaborative content component 102; a notification component 104, a live representation management component 106 (of FIG. 1), an application/service endpoint component 108 and/or a component for implementation of a programmed software module and/ or trained AI processing 110. In distributed examples, processing operations described in method 200 may be implemented by one or more computer components connected over a distributed network. For example, computer components may be executed on one or more network-enabled computing devices, connected over a distributed network, that enable access to user communications.

Method 200 begins at processing operation 202, where an indication of a user action is received. A user action is associated with a content update that is received via a GUI of a host application/service endpoint. For instance, an update to a component of a distributed collaborative canvas (or live representation) may occur through a host application/service such as a collaborative framework application/ service (e.g., providing a front-end representation of an open-source collaborative framework) and/or one of the other of plurality of host applications/services previously referenced in the present disclosure. A non-limiting example of a content update is an addition of a message notification, such as an at-mention (@mention) inline with presented content. As an example, a user action is a content update that adds an at-mention (@mention) to any of: 1) a distributed collaborative canvas (e.g., one or more content portions thereof); 2) a live representation of one or more content portions of a distributed collaborative canvas presented through a host application/service endpoint; and 3) inline with content of a host application/service endpoint. As one example an electronic document may be a representation of a distributed collaborative canvas (previously defined) that is stored on a distributed storage and collaboratively accessible by two or more users. An example of a distributed collaborative document is a MICROSOFT® FLUID® document that comprises a plurality of components in aggregation, where individual components of the document are also treatable as individual data objects (e.g., individual content portions). Description of a message notification as an at-mention/@mention is provided herein for ease of explanation. Similar processing of method 200 is also applicable to other types of triggers for automatic notification generation, as previously described in the present disclosure.

An indication of a user action may be received (processing operation 202) at one or more computing devices managing a computer component (e.g., of system diagram 100) such as a notification component 104 as described in FIG. 1. Receipt of the indication triggers interfacing with one or more other computer components (and/or computing devices) to execute analysis that generates a contextually relevant notification pertaining to an occurrence of a message notification. As an example, an exemplary notification component receives data indicating the occurrence of a content update that comprises a message notification from one or more of: a collaborative content component 102 (of FIG. 1); and an application/service endpoint component 108 (FIG. 1). In alternative examples, a task may be added to a distributed collaborative canvas triggering processing for automatic notification generation or a component (e.g., content portion) of interest is modified/updated, which is also a trigger for automatic notification generation.

In response to receiving (processing operation 202) the indication of the user action, flow of method 200 proceeds to processing operation 204. At processing operation 204, the user action is analyzed. Analysis of the user action comprises evaluation of aspects of the user action pertaining to one or more of: data (and metadata) associated with one or more components (e.g., content portion) in which a message notification was added; a user account (or accounts) identified as a creator of the message notification (@mention); a user account (or accounts) identified as a recipient of a message notification; and any type of signal data, as previously described comprising device-specific signal data, user-specific signal (activity) signal data, among other examples.

As an example, an analysis (processing operation 204) of a user action comprises: determining a user account set as a creator of an @mention; and determining a user account to set as a recipient of the @mention. This processing comprises analyzing exemplary signal data to identify specific user accounts associated with a message notification, where application-specific signal data and/or user-specific signal data may be used to identify a user account that is creating a message notification as well as a user account that is a recipient of the message notification. Furthermore, analysis of the user action comprises determining access permissions associated with identified users accounts. Determination of access permissions may comprise evaluating whether a creator of an @mention has permission to edit content (e.g., components of a distributed collaborative canvas) and further has permission to share content with other users. Similar determinations are generated with respect to a recipient of an @mention, where permissions for sharing, receiving, editing, etc. of components (of distributed collaborative canvas) are evaluated. In examples where permissions are not properly granted for creators and/or recipients, processing operation 204 may generate and render GUI features to aid management of access permissions. Management of access permissions pertaining to collaborative content is known to one skilled in the field of art.

Analysis (processing operation 204) of a user action further comprises: automatically creating a notification association between the user account, identified as the recipient of the at-mention, and a user account corresponding with a creator of the at-mention. The notification association is configured to automatically create a rule that transmits a notification to the user account, associated with the creator of the at-mention, when the first user account updates content provided in an exemplary live representation. This helps keeps the creator of the content in the loop as to when/how content of a distributed collaborative canvas is updated. In some alternative examples, a GUI feature is provided to a user to confirm creation of a notification association.

Moreover, analysis (processing operation 204) of a user action further comprises: programmatically determining a navigation parameter indicating a content sub-range of a component (e.g., content portion) of distributed collaborative canvas (or content portion of a host application/service) relative to an occurrence of message notification (e.g., the @mention). An exemplary navigation parameter is used to frame a representation of a component (e.g., content portion) for inclusion within a live representation of that component. In essence, the navigation parameter is a hint used to guide a host application/service (and associated endpoint) as to which portion of a document to render (e.g., what was the user working on in a document when the @mention occurred). Framing content around a message notification provides a recipient user account with a contextually relevant notification to aid task completion. As previously identified, data mappings may be created and retained to help identify components associated with a distributed collaborative canvas (e.g., a distributed collaborative document or group of documents). For instance, data associated with a component comprises but is not limited to: an identification of the component (component ID); markers indicating positioning/location of a component (e.g., start/end range of content); identification of content types and/or positioning/formatting of content (e.g., lines, rows, columns, sizing); timestamp data related to creation and management of components; and user account access relative to content, among other examples. Any combination of such data mapping attributes may be used to identify components of interest and associated data ranges relative to an occurrence of an @mention. In some alternative examples, a navigation parameter may be determined through user action that explicitly selects a content range relative to occurrence of an @mention or utilizes a GUI, through feature selection to accomplish the same.

Once a user action is analyzed (processing operation 204), flow of method 200 proceeds to processing operation 206. At processing operation 206, a notification for notifying the user account (recipient) of the @mention is automatically generated. As previously indicated, a notification component may interface with other computer components of system diagram 100 to generate a contextually relevant notification of a content update (including a message notification). For instance, the notification component may interface with a live representation management component and/or a component for implementation of a programmed software module and/or trained AI processing. Generation of an exemplary notification comprises a contextual relevance analysis that not only selects a specific host application/service endpoint to present the notification in, but also determines how/what specific content to present inline within the selected host application/service endpoint. For example, generation of a notification of the present disclosure comprises: selecting a host application/service endpoint to present the notification based on analysis of user context data associated with the user account; and generating a live representation of the distributed collaborative canvas (e.g., one or more targeted components) or content portions associated with the @mention provided through a host application/service. Processing to generate a live representation of a distributed collaborative canvas provides a contextually relevant representation of a distributed collaborative canvas that is tailored for the recipient user relative to the occurrence of the @mention. An exemplary live representation provides a deep link to the distributed collaborative canvas (or content portion provided through the host application/service) displaying only content, including the @mention, associated with the prior identified content sub-range based on analysis of the navigation parameter. Additional processing operations are also executable, where trained AI processing is applied to determine when to send a notification to a user (e.g., based on evaluation of user context) as well as when/if to send follow-up notifications.

Developers may apply predetermined rules that help guide a determination as to whether additional contextual information is to be collected and analyzed in determining how to generate a notification. In some scenarios, additional context information may be collected and analyzed depending on where the message notification (e.g., @mention) occurs. This may comprise an evaluation of the host application/service endpoint that the message notification occurs. For example, if an @mention occurs directly within a distributed collaborative canvas, additional contextual information may not be needed but may still be collected and analyzed to determine how to generate a notification. In another example, if @mention occurs in another host application/service, whether included in a live representation or independently inline with content of a host application/service endpoint, collected and analyzed to determine how to generate a notification. The selecting of the host application/service endpoint may further comprise: applying a AI model that is adapted to analyze the user context data associated with the user account to select, from a plurality of host application/service endpoints associated with the user account, the host application/service endpoint to render the notification. As an example, the applying of the trained AI model comprises: executing a relevance analysis that generates a relevance ranking of each of the plurality of host application/service endpoints associated with the user account based on a collective analysis of two or more of: a first metric generated based on an evaluation of a level of integration of a specific host service endpoint with an open-source collaborative framework; a second metric generated based on an evaluation of past user activity with the specific host application/service endpoint; a third metric generated based on an evaluation of current user activity with the specific host application/service endpoint. The host service endpoint is selected to present the notification based on a result of analyzing the relevance ranking associated with each of the plurality of host service endpoints; a fourth metric pertaining to a determination as to whether the location of a specific content update (e.g., message notification) is already represented within a host application/service endpoint for a specific user; or a combination thereof.

For reference, a first relevance scoring metric (or first set of metrics) evaluates the level of integration of a specific host application/service (and associated endpoints) with an open-source collaborative framework. This relevance analysis focuses on application-specific (or service-specific) data that indicates the level to which a specific host application/service (and associated endpoints thereof) can receive and process data in a format of an open-source collaborative framework. Levels of integration may be set by developers to identify how rich (and interactive) a representation of a component of the distributed collaborative canvas can be made. This may comprise determining whether a specific application/service is configured to convert data objects received in a specific data format pertaining to the open-source collaborative framework. In one such example, a determination as to a level of integration is a binary determination identifying whether a specific host application/service can (or cannot) process data objects in a specific data format pertaining to the open-source collaborative framework. For instance, a word processing application/service may be configured to process data objects of an open-source collaborative framework, but a spreadsheet application/service may not.

A first relevance scoring may be set according to the results of that binary determination. In another example, the first relevance scoring is generated based on evaluation of application-specific data associated with the open-source collaborative framework that identifies preferences for integrating components of the open-source collaborative framework within certain applications/services but not others. This analysis may further rank a relevance of specific host application/services for working with specific types of message notifications. When an @mention is the type of message notification received, a first relevance scoring metric (first metric) scores the relevance of a specific host application/service when working with @mentions. For instance, an email service or collaborative communication application/service may be a more relevant modality for presenting an @mention than a visual diagramming application/service. Examples of such relevance scoring metrics can be a binary determination but may also be represented as a confidence level percentage or the like.

For reference, a second relevance scoring metric (or second set of metrics) evaluates past user activity with the specific host application/service endpoint which may provide relevance determinations that can help indicate a preferred host application/service and associated endpoint. Past user activity data may be evaluated from a perspective of a specific user account (or group of users). As an example, a user account may be a user account that is a recipient of the message notification. For example, signal data (user-specific, device-specific, and/or application-specific) associated with the user account that is the recipient of the message notification may be analyzed to determine user preferences for receiving content within a host application/service and associated endpoints (e.g., mobile version versus desktop version). As an example, user preferences for receiving notifications may be identified from analyzing one or more of: any exemplary signal data previously described; frequency of use of applications/services (and associated endpoints); frequency of receipt of notifications via specific host applications/services (and associated endpoints); frequency of interactions and responses with notifications via specific host applications/services (and associated endpoints); evaluation of user activity relative to specific type of user notification (e.g., @mentions) relative to specific host applications/services (and associated endpoints); evaluation of data pertaining to collaborative interactions between users (including creator and recipient) via specific host applications/services (and associated endpoints); evaluation of outstanding tasks, comments, reminders associated with specific host applications/services (and associated endpoints); usage of specific user computing devices to access host applications/services (and associated endpoints); telemetric analysis derived from interactions with specific types of notifications; data analyzing previous modes of operation of a specific host application/service (and associated endpoints); and telemetry data pertaining to analytics of user activity across host applications/services (and associated endpoints), among other examples.

In some technical instances, signal data pertaining to past user activity, of a user account that is a recipient of a message notification, may be comparatively evaluated with signal data indicating past user activity of one or more other user accounts. As an example, past user activity of a group of users may be comparatively evaluated with that of the recipient of the message notification to generate relevance scoring as to how relevant a host application/service. Similarly, as indicated in the foregoing, the relevance determinations related to the second metric may evaluate a relevance of a host application/service endpoint (e.g., mobile version versus desktop version) for receiving notifications from a perspective of a specific user account (or group of users). In one alternative example, generation of the second relevance scoring may comprise generating multiple metrics (e.g., one for relevance of a host application/service and one for relevance of an endpoint) that are used to derive determinations for tailoring a notification.

For reference, a third relevance scoring metric (or third set of metrics) evaluates current user activity with the specific host application/service endpoint. Current user activity data may be evaluated from a perspective of a specific user account (or group of users). As an example, a user account may be a user account that is a recipient of the message notification. For example, signal data (user-specific, device-specific, and/or application-specific) associated with the user account that is the recipient of the message notification may be analyzed to determine a current user context pertaining to usage of a host application/service and associated endpoints (e.g., mobile version versus desktop version), user computing device usage and scheduled/upcoming tasks or reminder, among other examples. A user may be actively working in one host application/service (and associated endpoint) but not another. A user may be engaged in a chat conversation or electronic meeting including with a creator/sender of a message notification. A user may be preparing for an upcoming meeting that is scheduled to occur in a near time frame. As such, current user context may be identified from analyzing one or more of: any exemplary signal data previously described; current usage of applications/services (and associated endpoints); a mode of operation (e.g., is a user actively engaged in a specific application/service state, in a read-only mode, editing mode, etc.); evaluation of data pertaining to collaborative interactions between users (including creator and recipient) via specific host applications/services (and associated endpoints); evaluation of outstanding tasks, comments, reminders associated with specific host applications/services (and associated endpoints); usage of specific user computing devices to access host applications/services (and associated endpoints); evaluation of scheduled events, meetings, vacations, etc.; and interfacing between different host applications/services (and associated endpoints. among other examples.

In some technical instances, signal data pertaining to a current user context (e.g., of a user account that is a recipient of a message notification) may be comparatively evaluated with signal data indicating current user context of one or more other user accounts or with signal data analyzed relative to past user activity of the user account. As an example, current user context of a group of users may be comparatively evaluated with that of the recipient of the message notification to generate relevance scoring as to how relevant a host application/service may be. Consider another example where a current user context indicates that a user is actively using an email application/service and past usage activity indicates that the user prefers to receive a draft of a notification prior to the notification being sent. That comparative analysis may yield a relevance determination that dictates that a draft email notification be generated in a compose mode of the email service so that the user can review the same prior to sending. Similarly, as indicated in the foregoing, the relevance determinations related to the third metric may evaluate a relevance of a host application/service endpoint (e.g., mobile version versus desktop version) for receiving notifications from a perspective of a specific user account (or group of users). In one alternative example, generation of the third relevance scoring may comprise generating multiple metrics (e.g., one for relevance of a host application/service and one for relevance of an endpoint) that are used to derive determinations for tailoring a notification.

Furthermore, processing operations may be executed to apply rule-based analysis to select a template for rendering of an automatic notification once a specific host application/service (and associated endpoint) is selected. For instance, pre-formatted templates of notifications may be pre-generated for specific types of host applications/services and associated endpoints, where relevant data can be populated in the pre-formatted templates based on results of the analysis of the context evaluation. Processing to generate pre-formatted templates and populate the same are known to one skilled in the field of art. Above what is traditionally known, is the unique data and arrangement of content that is determined based on the analysis of the user action and contextual relevance determinations generated by the present disclosure. In other instances, notifications may be dynamically generated where the content and format of the notification is contextually tailored for a user (e.g., relative to the type of message notification). For instance, relevance determinations generated by processing of the present dictate how a notification is formatted, what content to include therein, what host application/service endpoint to present the notification and what mode of operation of a host application/service to notify a user.

For reference, a fourth relevance scoring metric (or fourth set of metrics) evaluates whether the location of a specific content update (e.g., message notification) is already represented within a host application/service endpoint for a specific user. In some instances, this is a binary determination as to whether content is presented in a live representation this is affected by the content update. When there are multiple instances of live representations presented across different host application/service endpoints, a relevance analysis is executed to determine a most relevant host application/service endpoint to render an update. A relevance analysis may score a relevance of the type of content update to the content (of live representations) that are already presented to users through different host application/service endpoints. Aspects related to comparative evaluation of renderings in host applications/services have been previously described and are applicable to generation of relevance scoring for a fourth relevance scoring metric.

For ease of understanding, one specific non-limiting example is now described pertaining to the contextual selection of a host service endpoint. The selecting of the host service endpoint to present the notification automatically determines, as the host service endpoint, an email service associated with the user account. This may occur based on contextual analysis of signal data indicating user preferences and/or activity for pertaining to the receipt of message notifications and/or application/service preferences set for specific types of message notifications relative to an open-source collaborative framework (e.g., MICROSOFT® FLUID®). Following that example, generating of the live representation comprises: automatically generating data for rendering the live representation within a body of an email, which can then be rendered by the email service. In another example, a host service endpoint determines that the most contextually relevant host service endpoint is a collaborative communication application/service (e.g., MICROSOFT® TEAMS®). For instance, a notification, including the live representation, may be automatically presented inline within a chat conversation of the collaborative communication application/service. In further examples, contextual analysis may select a specific device-endpoint for a selected host service. For example, a notification may be presented via a mobile version of a host service or a full access version (e.g., desktop version) of the host service.

In further technical instances, an update to a content portion, that is presented in the live representation or a change to the original content portion presented in the distributed collaborative canvas, results in synchronization between the distributed collaborative canvas and the live representation. For instance, an indication of an update to the live representation by the user account is received (e.g., via the embedded content presented within a GUI of a host application/service endpoint). In response to receiving the indication of the update to the live representation, the update is automatically applied to the distributed collaborative canvas via the deep link.

In other examples, notifications are generated to be sent to multiple users. As an example, a notification trigger could lead to the notification being sent to a group of multiple users or to a message board. One such instance is that where a triggering event could be a data point that indicates an error is occurring within a system and the resulting live notification could be sent to a dashboard that is viewable by multiple users. In other examples, a notification is sent to a team/group of users when a content update occurs to a collaborative content (e.g., component of distribute collaborative canvas or electronic document) or other synchronized content version.

Flow of method 200 then proceeds to processing operation 208. At processing operation 208, data for rendering the notification may be transmitted to a selected host application/service endpoint (or endpoints). For example, a notification component (104 of FIG. 1) interfaces with an application/service endpoint component (108 of FIG. 1) to propagate data for rendering a notification within a GUI of a host application/service endpoint. The data for rendering the notification comprises data that enables presentation of the notification including automatic rendering of the live representation inline with content of the host service endpoint.

At processing operation 210, the notification is automatically rendered within the host application/service endpoint based on a result of a receipt of a transmission of the data for rendering the notification. As previously mentioned, the notification, comprising the live representation, is rendered inline with content of the host service endpoint. An exemplary notification further comprises a link to original source content (e.g., the distributed collaborative canvas or a host application/service); contextual information pertaining to a message notification (e.g., the context surrounding the @mention including the user account that created the @mention, associated timestamp data, etc.). Additionally, other graphical user interface (GUI) elements may be incorporated in an exemplary notification to aid user understanding and productivity. For instance, data insights may be presented in association with a notification to provide context for creation/update to content portions of the distributed collaborative canvas relative to the live representation. In further instances, data insight notifications may be automatically created and transmitted to other user accounts associated with a distributed collaborative canvas (e.g., the creator of the message notification).

Flow of method 200 then proceeds to decision operation 212. At decision operation 212, it is determined whether there is an updated to distributed collaborative content displayed through a host application/service endpoint. As previously identified, there are a plurality of different contextual scenarios that may be encountered when dealing with distributed collaborative content. Multiple versions of distributed collaborative content may be presented through various host applications/services including but not limited to versions represented in a distributed collaborative canvas (e.g., a first host application/service) and a plurality of other host applications/services and associated endpoints (e.g., second host applications/services). For instance, a version of a distributed collaborative canvas may be rendered on a client computing device and a notification comprising a live representation of a component of that distributed collaborative canvas may be concurrently rendered on a different client computing device. Update to any of those representations is a trigger to synchronize content across any existing versions of the distributed collaborative content. In technical examples where no update is received to distributed collaborative content, flow of decision operation 212 branches "NO" and processing of method 200 remains idle until an update is received. In instances where an update is received to the distributed collaborative content through any existing version thereof, flow of decision operation 212 branches "YES" and processing of method 200 proceeds to processing operation 214.

At processing operation 214, an update to any associated version of distributed collaborative content is detected. For example, a component of the distributed collaborative canvas or other host application/service is synchronized with content displayed in any exemplary live representations. As such, an update to a content portion, that is presented in the live representation or a change to the original content portion presented in the distributed collaborative canvas, results in synchronization between the distributed collaborative canvas and the live representation. Computer components previously described interface to enable communication of content updates and foster synchronization of any existing versions across various host applications/services and associated endpoints. Consider an example where a component is part of a distributed collaborative canvas presented in a host application/service. In response to receiving the indication of the update to a live representation, a content update is automatically applied to the distributed collaborative canvas via the deep link created between the live representation and the distributed collaborative canvas.

In some examples of method 200, flow then proceeds to processing operation 216. At processing operation 216, a follow-up notification is automatically generated and transmitted to a creator of the message notification (@mention), where the notification provides contextual information notifying the creator of the message notification that a content update has been made (e.g., via a live representation). As previously described, analysis of a user action that involves a message notification comprises generating a notification association that is used to link the creator of the message notification with a recipient of the message notification. Such processing creates a technical benefit of keeping users always up to date, especially when working collaboratively across a plurality of host applications/services and associated endpoints.

FIGS. 3A-3F illustrate exemplary processing device views associated with user interface examples for an improved user interface that is adapted for generation and management of notifications of content updates across different host services relative to a distributed collaborative canvas, with which aspects of the present disclosure may be practiced. FIGS. 3A-3F provide non-limiting front-end examples of processing described in the foregoing including system diagram 100 and method 200 (FIG. 2).

FIG. 3A presents processing device view 300, illustrating a GUI 302 of a host service configured for management of a distributed collaborative canvas. As referenced in the foregoing description, an exemplary host service (for management of a distributed collaborative canvas) may be a host service associated with an open-source collaborative framework. Users can create, access, manage etc., content relative to a distributed collaborative canvas through a GUI (302) similar to that shown in processing device view 300. GUI 302 provides a representation of a distributed collaborative canvas that presents a distributed electronic document ("Document 1.fluid" created with under a format associated with the open-source collaborative framework (e.g., ".fluid").

In the example shown in processing device view 300, the distributed electronic document comprises a plurality of components, which are shown as components/content portions (e.g., "Agenda", "Notes" "Tasks"). For ease of understanding, only one component 304 ("Tasks") is numbered in processing device view 300. It is to be recognized that similar processing operations described with reference to component 304 are applicable to components of any data type or format. The components collectively represent content of the distributed electronic document but are also treated as individual data objects. As previously referenced, live representations of the present disclosure can be reflective of one or more individual components, while keeping an association to the distributed collaborative canvas and/or a distributed electronic document as an original source of a respective component.

Processing device view 300 illustrates a content update to component 304 ("Tasks"), where a message notification is added within the content of component 304. For instance, a user executes a user action 306 that adds: 1) textual input describing a task ("Add Data Link"); and 2) an associated message notification on the form of an @mention ("@Doug") to the "Assign To" field of component 304. Identification 308 of the message notification is labeled in processing device view 300, to help call out that addition of the message notification (@mention) is a trigger for back-end processing that leads to the processing device view illustrated in FIG. 3B.

FIG. 3B presents processing device view 310, illustrating a continued example of processing from that shown in processing device view 300 (FIG. 3A). Processing device view 310 illustrates a result of back-end contextual analysis described herein, where an exemplary notification (of a message notification) is generated for the @mention shown in processing device view 300. As indicated in the foregoing description, contextual analysis of a message notification comprises a selection of a host application/service endpoint to present a notification within (e.g., inline with other content the host application/service endpoint). In the example shown in processing device view 310, an email notification is presented inline within an inbox of an email service that is associated with a user account who is the recipient of the @mention. For example, based on a result of processing described herein, an email notification is automatically transmitted to an inbox of a user account who is the recipient of the @mention. The email notification may be displayed in a listing of received emails. Additionally, the GUI of the email application/service is configured to provide a preview (content preview) of that email notification. In processing device view 310, a user account is viewing, through a GUI of an email application/service (e.g., desktop version) the content of the email notification that presents the notification 312 pertaining to the message notification.

As can be seen in processing device view 310, the notification 312 pertaining to the message notification comprises a live representation 314 that is presented inline within a GUI of the email application/service. An exemplary live representation provides 314 a deep link to the distributed collaborative canvas (or content portion of a host application/service) displaying only content, including the at-mention, associated with the content sub-range based on analysis of the navigation parameter. As previously referenced, an exemplary notification 312 further comprises a link to the distributed collaborative canvas (e.g., distributed collaborative document), contextual information pertaining to a message notification (e.g., the context surrounding the at-mention including the user account that created the @mention, associated timestamp data, etc.). Additionally, other graphical user interface (GUI) elements may be incorporated in an exemplary notification 312 to aid user understanding and productivity. For instance, data insights may be presented in association with a notification to provide context for creation/update to content portions of the distributed collaborative canvas relative to the live representation. In further instances, data insight notifications may be automatically created and transmitted to other user accounts associated with a distributed collaborative canvas (e.g., the creator of the message notification).

The live representation 314 provides an editable snapshot of the distributed collaborative canvas that presents a component (or content portion) that is associated with the message notification (@mention). For instance, a representation of component 304 ("Tasks") is presented. The representation is editable and is synchronized with the original content source (distributed collaborative canvas) displaying only content relative to the @mention. As previously referenced, displayed content is selected based on the back-end processing that analyzes a navigation parameter (e.g., of the distributed collaborative canvas), where a content sub-range (pertaining to the message notification) is set for presentation of content within a live representation 314. Any changes to the component 304 displayed in the live representation 314 and/or the original source (e.g., "Document1.fluid") would result in automatic update to the content displayed in the live representation 314 as well as the distributed collaborative canvas.

Furthermore, the live representation 314, shown in processing device view 310, further comprises contextual information 316 identifying why the notification is relevant to the user. For instance, contextual information 316 spelling out that a user ("Brian Theo") mentioned the user account in a component of the distributed collaborative canvas as well as timestamp data associated with the detection of a user action that adds a message notification. This provides the user with context relative to the occurrence of the user action that adds the @mention. Moreover, the live representation 314 comprises a link 318 to the original source content. Continuing the example referenced in FIG. 3A, a link 318 is provided which ties the displayed component 304 ("Tasks") back to the distributed collaborative canvas ("Document1.fluid"). As the live representation 314 provides a live snapshot of a component associated with the message notification (@mention), selection of the link 318 enables users to be automatically taken to the original source content ("Document1.fluid"). It is further noted that additional contextual information may be presented inline with content of a selected host application/service endpoint as part of the notification 312. For instance, data insights and/or contextually relevant notifications (e.g., content related to contextual information 316) may be presented outside of the live representation 314 but inline with content of a host application/service as part of the notification 312.

Figure 3C:
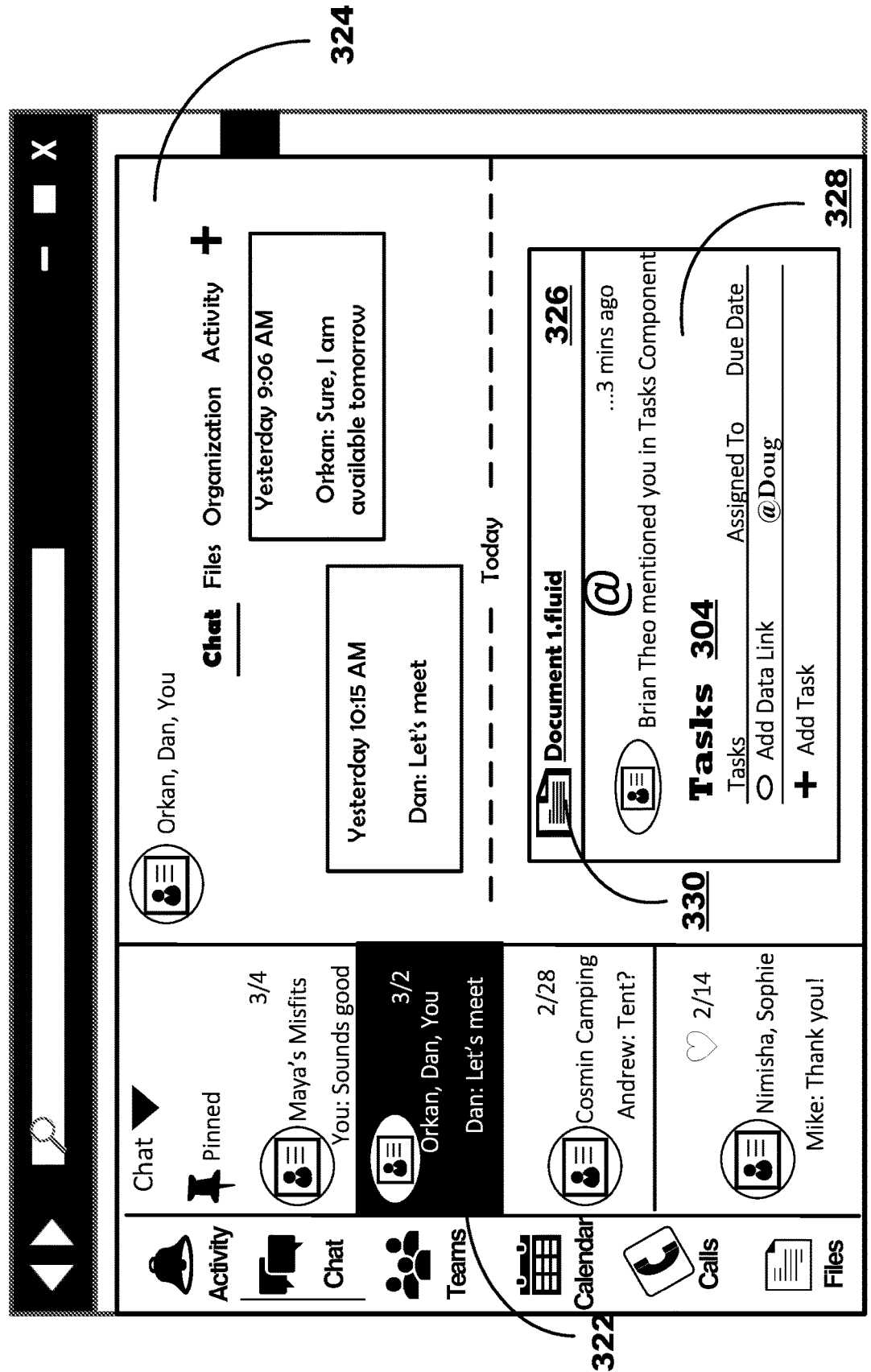

FIG. 3C presents processing device view 320, illustrating a continued example of processing from that shown in processing device view 300 (FIG. 3A). Processing device view 310 illustrates an alternative example to that shown in FIG. 3B, where a collaborative communication application/service is selected as a host application/service for automatic presentation of an exemplary notification. Again, selection of the specific host application/service and/or related endpoints thereof may occur based on the back-end contextual analysis previously described. Processing device view 320 specifically calls out that a notification 322 may be provided inline with content of the collaborative communication application/service. For instance, an exemplary notification 322 automatically directs a user account to a specific chat conversation within the collaborative communication application/service. This is shown as a second chat conversation being highlighted for the user as part of notification 322.

It is to be recognized that similar notification processing may exist in any GUI instances where multiple panes are displayed for a user including a listing of specific content types (e.g., an email listing, message listing, meeting listing). For instance, data for rendering a notification within a specific host application/service endpoint may automatically provide a bifurcated level of notification, where a first notification part may automatically occur in one GUI pane (e.g., a listing of content); and a second notification part may automatically occur in a second GUI pane (e.g., identification of specific type of content). For ease of visual understanding, a similar bifurcated level of notification is illustrated in processing device view 310 (FIG. 3A). Concurrently with the notification 322, content 324 associated with the highlighted chat conversation is presented inline within a GUI of the collaborative communication application/service. As shown in processing device view 320, the content 324 comprises multiple messages exchanged by users of the respective chat conversation as well as presentation of a version of a live representation 326 inline within the content 324 of the chat conversation. Similar to the previous example shown in processing device view 310 (FIG. 3B), live representation 326 comprises a representation of component 304 ("Tasks") as presented within the distributed collaborative canvas (original source content). The representation is editable and is synchronized with the original content source (distributed collaborative canvas) displaying only content relative to the @mention (e.g., based on application of a navigation parameter).

Furthermore, the live representation 326 comprises contextual information 316 identifying why the notification is relevant to the user. For instance, contextual information 328 spelling out that a user ("Brian Theo") mentioned the user account in a component of the distributed collaborative canvas as well as timestamp data associated with the detection of a user action that adds a message notification. This provides the user with context relative to the occurrence of the user action that adds the @mention. Moreover, the live representation 326 comprises a link 330 to the original source content (e.g., the distributed collaborative canvas "Document1.fluid").

Figure 3D:
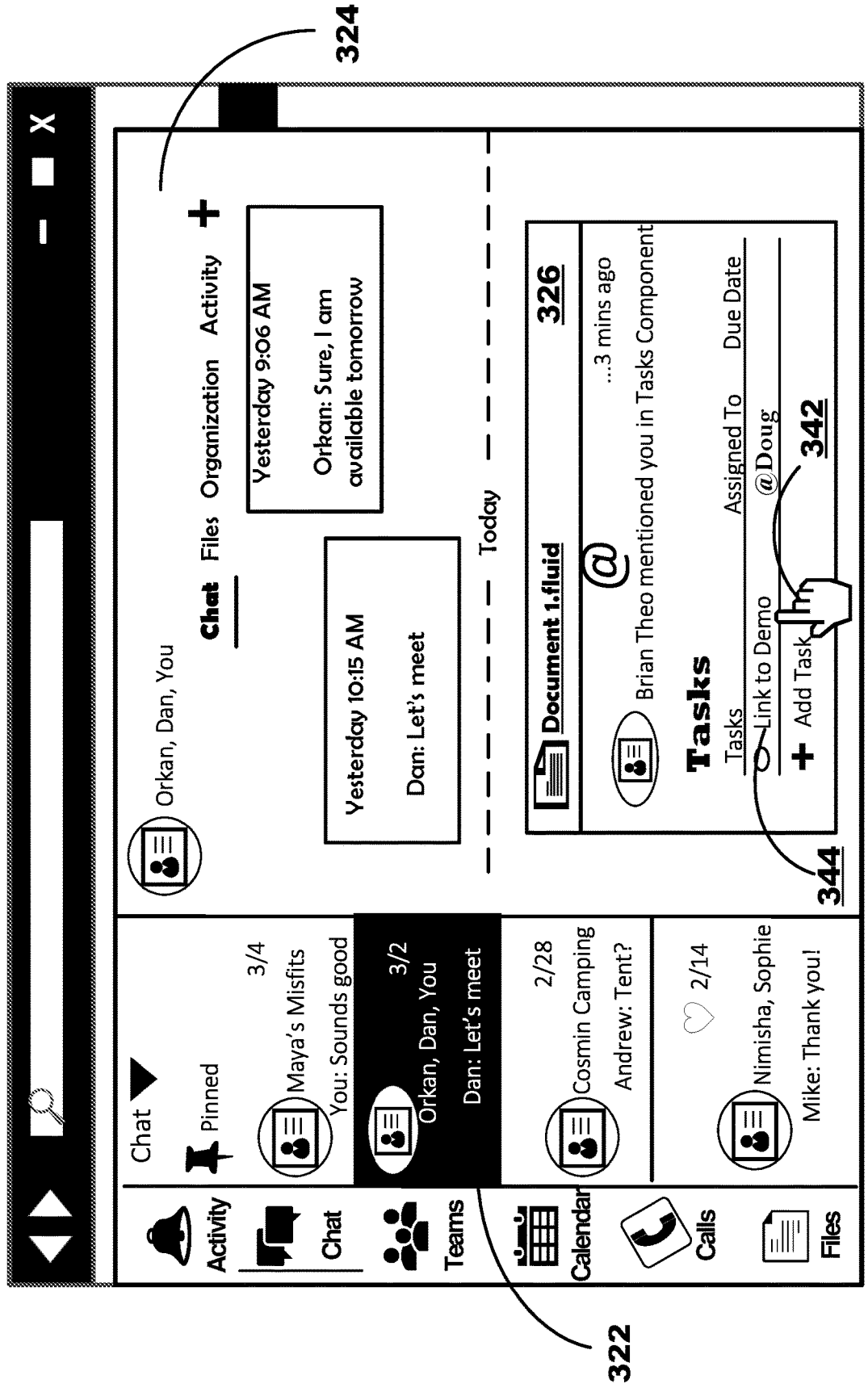

FIG. 3D presents processing device view 340, illustrating a continued example of processing from that shown in processing device view 320 (FIG. 3C). As previously identified, any changes to the component 304 displayed in a version of a live representation and/or the original source (e.g., "Document1.fluid") would result in automatic update to the content displayed in a live representation as well as the distributed collaborative canvas. In the example shown in processing device view 340, a user action 343 is received that edits the component 304 (e.g., changing text of a task from "Add Data Link" to "Link to Demo"). As a result, content 344 associated with a sub-field of the component 304 is updated in a presentation version of the live representation 326. This processing illustrates that a live snapshot is rendered where the live representation 326 is editable in real-time.

Figure 3E:
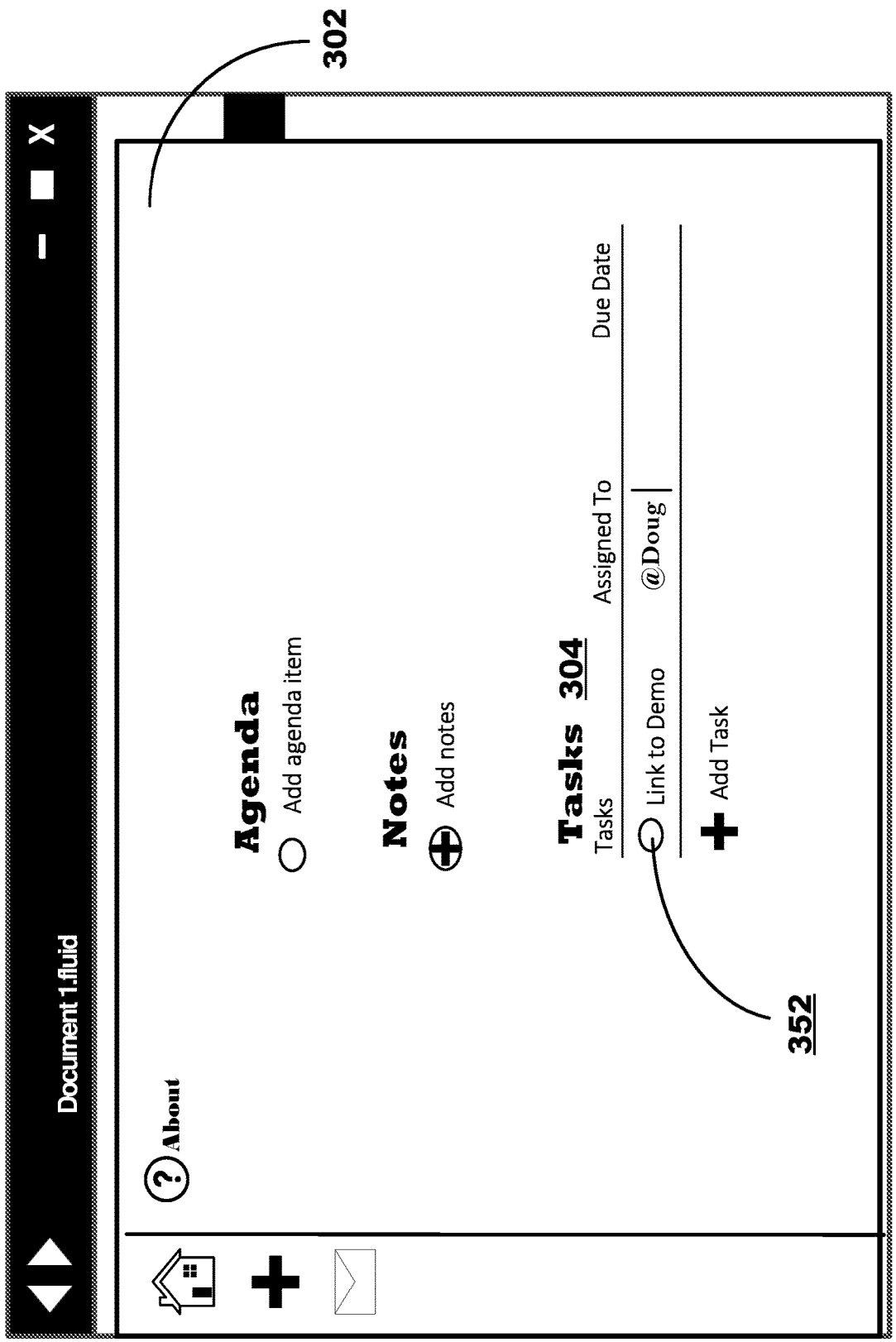

FIG. 3E presents processing device view 350, illustrating a continued example of processing from that shown in processing device view 340 (FIG. 3D). Processing device view 350 highlights the synchronization (e.g., deep data link) between the live representation 326 (shown in FIG. 3D) and the distributed collaborative canvas. For instance, processing of the update to the content 344 in the live representation 326 triggers an automatic update of the component 304 presented in distributed collaborative canvas. For instance, automatic system action occurs that updates the content 352 associated with a sub-field of the component 304 as displayed in GUI 302 presenting the distributed collaborative canvas. The update to the content 352 occurs in real-time (or near real-time) proximate to the update of the live representation 326. In this way, versions of component 304 can remain synchronized despite representations being presented in different host applications/ services and associated endpoints.

FIG. 3F presents processing device view 360, illustrating a continued example of processing from that shown in processing device view 350 (FIG. 3E). As described relative to processing device view 350, automatic system action occurs that updates the content 352 associated with a sub-field of the component 304 as displayed in GUI 302 presenting the distributed collaborative canvas. Processing device view 360 highlights additional novel GUI functionality where additional data insights can be generated and presented to users of a collaborative document in real-time. This can help keep users up to date when they access a distributed collaborative canvas and/or distributed electronic document and see a change to one or more components thereof. In the example shown in processing device view 360, a user may notice to the change to the content 352 and execute a user action 362 that hovers over a specific content portion (e.g., the sub-field of the component 304). In response to a receipt of user action 362, a system is configured to automatically render a data insight notification 364 providing contextual information about the update to the content 352. For instance, data insight notification 364 provides contextual data identifying how the content was edited, when the content was edited, and what user account edited the content. This helps users keep track of collaborative updates across multiple different host applications/ services.

FIG. 4 illustrates a computing system 401 suitable for implementing processing operations described herein related to generation and management of notifications of content updates across different host services relative to a distributed collaborative canvas, with which aspects of the present disclosure may be practiced. As referenced above, computing system 401 may be configured to implement processing operations of any component described herein including exemplary components previously described in system diagram 100 (FIG. 1). As such, computing system 401 may be configured to execute specific processing operations to solve the technical problems described herein, which comprise processing operations for intelligent and timely notifications of content updates including messaging (e.g., at-mentions) within content of a distributed collaborative canvas and/or live representation of one or more content portions of a collaborative distributed document. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406A-D) that are configured to enable functionality described herein. In some examples, computing system 401 may be connected to other computing devices (e.g., display device, audio devices, servers, mobile/ remote devices, gaming devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), processing operations described in method 200 (FIG. 2) and/or the accompanying description of FIGS. 3A-3F.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing a collaborative content component 406a; a notification component 406b; a live representation management component 406c; and an application/service endpoint component 406d, as described herein. In further examples, software may comprise program instructions for executing a separate component for implementation of a programmed software module and/or trained AI processing though in other instances a programmed software module and/or trained AI processing may be executed by one of the other components of system diagram 100 in combination with one or more computing systems 401.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: an improved GUI providing automatic generation of notifications of content updates (e.g., messages) including live representations; synchronization of updates to a distributed collaborative canvas and associated live representations of content associated therewith; generation and management of contextual data insights related to content updates (messages), etc.; providing follow-up notifications (e.g., to creators of a content portion and/or message); and providing notifications through different host service endpoints (e.g., via GUI elements, OS notifications and/or inline with content), among other examples. User interface system 409 comprises a graphical user interface that presents graphical user interface elements representative of any point in the processing described in the foregoing description including processing operations described in system diagram 100 (FIG. 1), method 200 (FIG. 2) and front-end representations related to the description of FIGS. 3A-3F. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Some non-limiting examples of the present disclosure describe systems and/or method for managing automated notifications of content update through the generation and presentation of a live representation of one or more content portions. For instance, a computer-implemented method may be executed across at least one computing device, including a system, to accomplish processing described herein. A specific type of content update, such as an inclusion of message notification (e.g., an at-mention or @mention), may be a trigger for executing processing of the presentation disclosure. However, it is to be recognized that processing described herein is applicable to work with any type of content update to a content portion (e.g., included in a distributed collaborative canvas or provided through a host application/service endpoint).

In one non-limiting example, an indication of a user action is received, where the user action is a content update that adds an at-mention (@mention) to any of: 1) a distributed collaborative canvas (e.g., one or more content portions thereof); 2) a live representation of one or more content portions of a distributed collaborative canvas presented through a host application/service endpoint; and 3) inline to content of a host application/service endpoint. As one example, a distributed collaborative canvas may be represented as an electronic document (e.g., distributed electronic document) that is stored on a distributed storage and collaboratively accessible by two or more users. An example of a distributed collaborative document is a MICROSOFT® FLUID® document that comprises a plurality of components in aggregation, where individual components of the document are also treatable as individual data objects (e.g., individual content portions). In response to receiving the indication of the user action, the user action is analyzed. Analysis of the user action comprises: determining a user account to set as a recipient of the at-mention (@mention); and programmatically determining a navigation parameter indicating a content sub-range of the content portion of distributed collaborative canvas relative to an occurrence of the at-mention. Furthermore, the analyzing of the user action may further comprise: automatically creating a notification association between the user account, identified as the recipient of the at-mention, and a second user account corresponding with a creator of the at-mention. The notification association is configured to automatically create a rule that transmits a notification to the second user account, associated with the creator of the at-mention, when the first user account updates content provided in the live representation. This helps keeps the creator of the content in the loop as to when/how content of a distributed collaborative canvas is updated.

Moreover, a notification for notifying the user account (recipient) of the at-mention (@mention) is automatically generated. Generation of an exemplary notification comprises a contextual relevance analysis that determines not only select a specific host service endpoint to present the notification in but also determine how/what specific content to present inline within the selected host service endpoint. For example, generation of a notification of the present disclosure comprises: selecting a host service endpoint to present the notification based on analysis of user context data associated with the user account; and generating a live representation of the distributed collaborative canvas (or content portions). The selecting of the host service endpoint further comprises: applying a trained artificial intelligence (AI) model that is adapted to analyze the user context data associated with the user account to select, from a plurality of host service endpoints associated with the user account, the host service endpoint. The applying of the trained AI model comprises: executing a relevance analysis that generates a relevance ranking of each of the plurality of host service endpoints associated with the user account based on a collective analysis of two or more of: a first metric generated based on an evaluation of a level of integration of a specific host service endpoint with an open-source collaborative framework; a second metric generated based on an evaluation of past user activity with the specific host service endpoint; and; a third metric generated based on an evaluation of current user activity with the specific host service endpoint. The host service endpoint is selected to present the notification based on a result of analyzing the relevance ranking associated with each of the plurality of host service endpoints.

An exemplary live representation provides a deep link to the distributed collaborative canvas displaying only content, including the at-mention (@mention), associated with the content sub-range based on analysis of the navigation parameter. Data for rendering the notification may be transmitted to a selected host service endpoint (or endpoints). The data for rendering the notification comprises data that enables presentation of the notification including automatic rendering of the live representation inline with content of the host service endpoint. In further examples, the notification is automatically rendered within the host service endpoint based on a result of a receipt of a transmission of the data for rendering the notification. As previously mentioned, the notification, comprising the live representation, is rendered inline with content of the host service endpoint. An exemplary notification further comprises a link to the distributed collaborative canvas, contextual information pertaining to a message notification (e.g., the context surrounding the at-mention including the user account that created the @mention, associated timestamp data, etc.). Additionally, other graphical user interface (GUI) elements may be incorporated in an exemplary notification to aid user understanding and productivity. For instance, data insights may be presented in association with a notification to provide context for creation/update to content portions of the distributed collaborative canvas relative to the live representation. In further instances, data insight notifications may be automatically created and transmitted to other user accounts associated with a distributed collaborative canvas (e.g., the creator of the message notification).

For ease of understanding, one specific non-limiting example is now described pertaining to the contextual selection of a host service endpoint. The selecting of the host service endpoint to present the notification automatically determines, as the host service endpoint, an email service associated with the user account. This may occur based on contextual analysis of signal data indicating user preferences and/or activity for pertaining to the receipt of message notifications and/or application/service preferences set for specific types of message notifications relative to an open-source collaborative framework (e.g., MICROSOFT® FLUID®). Following that example, generating of the live representation comprises: automatically generating data for rendering the live representation within a body of an email, which can then be rendered by the email service. In another example, a host service endpoint determines that the most contextually relevant host service endpoint is a collaborative communication application/service (e.g., MICROSOFT® TEAMS®). For instance, a notification, including the live representation, may be automatically presented inline within a chat conversation of the collaborative communication application/service. In further examples, contextual analysis may select a specific device-endpoint for a selected host service. For example, a notification may be presented via a mobile version of a host service or a full access version (e.g., desktop version) of the host service.

In further technical instances, an update to a content portion, that is presented in the live representation or a change to the original content portion presented in the distributed collaborative canvas, results in synchronization between the distributed collaborative canvas and the live representation. For instance, an indication of an update to the live representation by the user account is received (e.g., via the embedded content presented within a GUI of a host application/service endpoint). In response to receiving the indication of the update to the live representation, the update is automatically applied to the distributed collaborative canvas via the deep link.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:
1. A computer-implemented method comprising:
receiving an indication of a user action that adds an at-mention (@mention) to a distributed collaborative canvas;
in response to receiving the indication, analyzing the user action that comprises:
determining a user account to set as a recipient of the at-mention, and
programmatically determining a navigation parameter indicating a content sub-range of the distributed collaborative canvas relative to an occurrence of the at-mention;
generating a notification for notifying the user account, set as the recipient, of the at-mention, wherein the generating of the notification comprises:

selecting a host service endpoint to present the notification based on analysis of user context data associated with the user account, and generating a live representation of the distributed collaborative canvas that provides a deep link to the distributed collaborative canvas displaying only content, including the at-mention, associated with the content sub-range based on analysis of the navigation parameter; and transmitting, to the host service endpoint, data for rendering the notification, including the live representation, inline with content of the host service endpoint.

2. The computer-implemented method of claim 1, further comprising: rendering, within the host service endpoint, the notification, including the live representation, inline with content provided by the host service endpoint.

3. The computer-implemented method of claim 1, further comprising: receiving an indication of an update to the live representation by the user account; and in response to receiving the indication of the update to the live representation, automatically applying, via the deep link, the update to the distributed collaborative canvas.

4. The computer-implemented method of claim 1, wherein the selecting of the host service endpoint to present the notification automatically determines, as the host service endpoint, an email service associated with the user account, and wherein the generating of the live representation comprises: automatically generating data for rendering the live representation within a body of an email, for rendering in the email service, and automatically transmitting the data for rendering the live representation within the body of the email to an email inbox associated with the user account.

5. The computer-implemented method of claim 1, wherein the analyzing of the user action further comprises automatically creating a notification association between the user account identified as the recipient of the at-mention and a second user account corresponding with a creator of the at-mention, wherein notification association is configured to automatically create a rule that transmits a notification to the second user account, associated with the creator of the at-mention, when the first user account updates content provided in the live representation.

6. The computer-implemented method of claim 1, wherein the selecting of the host service endpoint further comprises: applying a trained artificial intelligence (AI) model that is adapted to analyze the user context data associated with the user account to select, from a plurality of host service endpoints associated with the user account, the host service endpoint, and wherein the applying of the trained AI model comprises: executing a relevance analysis that generates a relevance ranking of each of the plurality of host service endpoints associated with the user account based on a collective analysis of: a first metric generated based on an evaluation of a level of integration of a specific host service endpoint with an open-source collaborative framework, and a second metric generated based on an evaluation of past user activity of the user account with the specific host service endpoint, and wherein the host service endpoint is selected to present the notification based on a result of analyzing the relevance ranking associated with each of the plurality of host service endpoints.

7. The computer-implemented method of claim 1, wherein the selecting of the host service endpoint further comprises: applying a trained artificial intelligence (AI) model that is adapted to analyze the user context data associated with the user account to select, from a plurality of host service endpoints associated with the user account, the host service endpoint, and wherein the applying of the trained AI model comprises: executing a relevance analysis that generates a relevance ranking of each of the plurality of host service endpoints associated with the user account based on a collective analysis of: a first metric generated based on an evaluation of a level of integration of a specific host service endpoint with an open-source collaborative framework, and a second metric generated based on an evaluation of current user activity with each of the specific host service endpoint, and wherein the host service endpoints is selected to present the notification based on a result of analyzing the relevance ranking associated with each of the plurality of host service endpoints.

8. A system comprising:

at least one processor; and a memory, operatively connected with the at least one processor, storing computer-executable instructions that, when executed by the at least one processor, causes the at least one processor to execute a method that comprises:

receiving an indication of a user action that adds an at-mention (@mention) to a distributed collaborative canvas;

in response to receiving the indication, analyzing the user action that comprises:

determining a user account to set as a recipient of the at-mention, and programmatically determining a navigation parameter indicating a content sub-range of the distributed collaborative canvas relative to an occurrence of the at-mention;

generating a notification for notifying the user account, set as the recipient, of the at-mention, wherein the generating of the notification comprises:

selecting a host service endpoint to present the notification based on analysis of user context data associated with the user account, and generating a live representation of the distributed collaborative canvas that provides a deep link to the distributed collaborative canvas displaying only content, including the at-mention, associated with the content sub-range based on analysis of the navigation parameter; and transmitting, to the host service endpoint, data for rendering the notification, including the live representation, inline with content of the host service endpoint.

9. The system of claim 8, wherein the method, executed by the at least one processor, further comprises: rendering, within the host service endpoint, the notification, including the live representation, inline with content provided by the host service endpoint.

10. The system of claim 8, wherein the method, executed by the at least one processor, further comprises: receiving an indication of an update to the live representation by the user account; and in response to receiving the indication of the update to the live representation, automatically applying, via the deep link, the update to the distributed collaborative canvas.

11. The system of claim 8, wherein the selecting of the host service endpoint to present the notification automatically determines, as the host service endpoint, an email service associated with the user account, and wherein the generating of the live representation comprises: automatically generating data for rendering the live representation within a body of an email, for rendering in the email service, and automatically transmitting the data for rendering the live representation within the body of the email to an email inbox associated with the user account.

12. The system of claim 8, wherein the analyzing of the user action further comprises automatically creating a notification association between the user account identified as the recipient of the at-mention and a second user account corresponding with a creator of the at-mention, wherein notification association is configured to automatically create a rule that transmits a notification to the second user account, associated with the creator of the at-mention, when the first user account updates content provided in the live representation.

13. The system of claim 8, wherein the selecting of the host service endpoint further comprises: applying a trained artificial intelligence (AI) model that is adapted to analyze the user context data associated with the user account to select, from a plurality of host service endpoints associated with the user account, the host service endpoint, and wherein the applying of the trained AI model comprises: executing a relevance analysis that generates a relevance ranking of each of the plurality of host service endpoints associated with the user account based on a collective analysis of: a first metric generated based on an evaluation of a level of integration of a specific host service endpoint with an open-source collaborative framework, and a second metric generated based on an evaluation of past user activity of the user account with the specific host service endpoint, and wherein the host service endpoint is selected to present the notification based on a result of analyzing the relevance ranking associated with each of the plurality of host service endpoints.

14. The system of claim 8, wherein the selecting of the host service endpoint further comprises: applying a trained artificial intelligence (AI) model that is adapted to analyze the user context data associated with the user account to select, from a plurality of host service endpoints associated with the user account, the host service endpoint, and wherein the applying of the trained AI model comprises: executing a relevance analysis that generates a relevance ranking of each of the plurality of host service endpoints associated with the user account based on a collective analysis of: a first metric generated based on an evaluation of a level of integration of a specific host service endpoint with an open-source collaborative framework, and a second metric generated based on an evaluation of current user activity with each of the plurality of host service endpoints, and wherein the host service endpoints is selected to present the notification based on a result of analyzing the relevance ranking associated with each of the plurality of host service endpoints.

15. A computer-implemented method comprising:
receiving an indication of a user action that adds an at-mention (@mention) to a distributed collaborative canvas;
in response to receiving the indication, analyzing the user action that comprises:
determining a user account to set as a recipient of the at-mention, and
programmatically determining a navigation parameter indicating a content sub-range of the distributed collaborative canvas relative to an occurrence of the at-mention;
generating a notification for notifying the user account, set as the recipient, of the at-mention, wherein the generating of the notification comprises:
selecting a host service endpoint to present the notification based on analysis of user context data associated with the user account, and
generating a live representation of the distributed collaborative canvas that provides a deep link to the distributed collaborative canvas displaying only content, including the at-mention, associated with the content sub-range based on analysis of the navigation parameter; and
rendering, within the host service endpoint, the notification, including the live representation, inline with content provided by the host service endpoint.

16. The computer-implemented method of claim 15, further comprising: receiving an indication of an update to the live representation by the user account; and in response to receiving the indication of the update to the live representation, automatically applying, via the deep link, the update to the distributed collaborative canvas.

17. The computer-implemented method of claim 15, wherein the selecting of the host service endpoint to present the notification automatically determines, as the host service endpoint, an email service associated with the user account, and wherein the generating of the live representation comprises: automatically generating data for rendering the live representation within a body of an email, for rendering in the email service, and automatically transmitting the data for rendering the live representation within the body of the email to an email inbox associated with the user account.

18. The computer-implemented method of claim 15, wherein the analyzing of the user action further comprises automatically creating a notification association between the user account identified as the recipient of the at-mention and a second user account corresponding with a creator of the at-mention, wherein notification association is configured to automatically create a rule that transmits a notification to the second user account, associated with the creator of the at-mention, when the first user account updates content provided in the live representation.

19. The computer-implemented method of claim 15, wherein the selecting of the host service endpoint further comprises: applying a trained artificial intelligence (AI) model that is adapted to analyze the user context data associated with the user account to select, from a plurality of host service endpoints associated with the user account, the host service endpoint, and wherein the applying of the trained AI model comprises: executing a relevance analysis that generates a relevance ranking of each of the plurality of host service endpoints associated with the user account based on a collective analysis of: a first metric generated based on an evaluation of a level of integration of a specific host service endpoint with an open-source collaborative framework, and a second metric generated based on an evaluation of past user activity of the user account with the specific host service endpoint, and wherein the host service endpoint is selected to present the notification based on a result of analyzing the relevance ranking associated with each of the plurality of host service endpoints.

20. The computer-implemented method of claim 15, wherein the selecting of the host service endpoint further comprises: applying a trained artificial intelligence (AI) model that is adapted to analyze the user context data associated with the user account to select, from a plurality of host service endpoints associated with the user account, the host service endpoint, and wherein the applying of the trained AI model comprises: executing a relevance analysis that generates a relevance ranking of each of the plurality of host service endpoints associated with the user account based on a collective analysis of: a first metric generated based on an evaluation of a level of integration of a specific host service endpoint with an open-source collaborative framework, and a second metric generated based on an evaluation of current user activity with the specific host service endpoint, and wherein the host service endpoint is selected to present the notification based on a result of analyzing the relevance ranking associated with each of the plurality of host service endpoints.

\* \* \* \* \*